(12) United States Patent
Suk et al.

(10) Patent No.: US 11,673,617 B2
(45) Date of Patent: Jun. 13, 2023

(54) AIRFOILS AND MACHINES INCORPORATING AIRFOILS

(71) Applicant: ESS 2 Tech, LLC, Bethlehem, PA (US)

(72) Inventors: Michael Suk, Milton, PA (US); David A. Shoffler, Marion Heights, PA (US)

(73) Assignee: ESS 2 TECH, LLC, Bethlehem, PA (US)

( * ) Notice: Subject to any disclaimer, the term of this patent is extended or adjusted under 35 U.S.C. 154(b) by 0 days.

(21) Appl. No.: 17/841,945

(22) Filed: Jun. 16, 2022

(65) Prior Publication Data

US 2022/0348270 A1 Nov. 3, 2022

Related U.S. Application Data

(60) Continuation of application No. 17/008,846, filed on Sep. 1, 2020, now Pat. No. 11,390,333, which is a
(Continued)

(51) Int. Cl.
*B62D 35/00* (2006.01)
*B64C 3/14* (2006.01)
(Continued)

(52) U.S. Cl.
CPC ............. *B62D 35/001* (2013.01); *B64C 3/14* (2013.01); *B64C 11/18* (2013.01); *B64C 27/467* (2013.01);
(Continued)

(58) Field of Classification Search
CPC .... B62D 35/001; B62D 35/007; B62D 37/02; F01D 1/145; F04D 29/281; F04D 29/384;
(Continued)

(56) References Cited

U.S. PATENT DOCUMENTS 1,361,277 A 12/1920 Mott
2,592,227 A 4/1952 Clifton
(Continued)

FOREIGN PATENT DOCUMENTS

CN 102022258 A 4/2011
CN 111770874 A 10/2020
(Continued)

OTHER PUBLICATIONS

International Search Report and Written Opinion dated May 8, 2019 for corresponding Application No. PCT/US2018/67639.
(Continued)

*Primary Examiner* — Gregory A Blankenship
(74) *Attorney, Agent, or Firm* — Plumsea Law Group, LLC

(57) ABSTRACT

Various embodiments of an airfoil and machines with airfoils are disclosed. The airfoils include a thicker leading airfoil portion and a thinner trailing airfoil portion. In one embodiment, the leading airfoil portion is formed by bending a body of the airfoil back toward itself. In another embodiment, the leading airfoil portion has a solid geometry and includes two elliptic surfaces. To prevent detachment of airflow, the leading airfoil portion includes at least two arc portions or surfaces that act to direct the airflow down to the trailing airfoil portion in a manner that stabilizes vortexes that may form in the region of changing thickness.

20 Claims, 22 Drawing Sheets

Related U.S. Application Data division of application No. 15/969,347, filed on May 2, 2018, now Pat. No. 10,766,544.

(60) Provisional application No. 62/611,890, filed on Dec. 29, 2017.

(51) Int. Cl.

| | | |
|---|---|---|
| *F01D 5/14* | (2006.01) | |
| *F04D 29/38* | (2006.01) | |
| *B64C 11/18* | (2006.01) | |
| *F04D 29/28* | (2006.01) | |
| *B64C 27/467* | (2006.01) | |
| *F04D 29/42* | (2006.01) | |
| *F15D 1/00* | (2006.01) | |
| *F04D 29/68* | (2006.01) | |
| *F03D 3/06* | (2006.01) | |
| *F03D 1/06* | (2006.01) | |

(52) U.S. Cl.
CPC ........... *F01D 5/145* (2013.01); *F04D 29/281* (2013.01); *F04D 29/384* (2013.01); *F04D 29/422* (2013.01); *F04D 29/681* (2013.01); *F15D 1/00* (2013.01); *B62D 35/007* (2013.01); *B64C 2003/146* (2013.01); *B64C 2003/147* (2013.01); *F03D 1/0683* (2013.01); *F03D 3/061* (2013.01); *F05B 2240/221* (2013.01); *F05B 2250/14* (2013.01); *F05D 2230/54* (2013.01); *F05D 2250/713* (2013.01)

(58) Field of Classification Search
CPC .... F04D 29/422; F04D 29/681; F03D 1/0683; F03D 1/061; F15D 1/00; F05B 2240/221; F05B 2250/14; F05B 2230/54; F05B 2250/713; B64C 3/14; B64C 11/18; B64C 27/467; B64C 2003/146; B64C 2003/147
See application file for complete search history.

(56) References Cited

U.S. PATENT DOCUMENTS

| | | | |
|---|---|---|---|
| 3,000,401 A | 9/1961 | Ringleb | |
| 3,807,663 A | 4/1974 | Bartoe, Jr. | |
| 3,830,450 A | 8/1974 | Williams et al. | |
| 3,929,369 A | 12/1975 | Blair | |
| 3,999,797 A * | 12/1976 | Kirsch | B62D 35/001 244/130 |
| 4,236,866 A | 12/1980 | Martinez | |
| 4,318,565 A | 3/1982 | Lay | |
| 4,434,957 A * | 3/1984 | Moritz | B64C 21/10 416/223 R |
| 4,603,898 A | 8/1986 | Udagwa et al. | |
| 4,611,796 A | 9/1986 | Orr | |
| 4,674,788 A | 6/1987 | Ohmura et al. | |
| 4,822,249 A | 4/1989 | Eckardt et al. | |
| 4,975,023 A | 12/1990 | Miura et al. | |
| 5,106,147 A | 4/1992 | Okada et al. | |
| 5,316,443 A | 5/1994 | Smith | |
| 5,324,092 A | 6/1994 | Burg | |
| 5,356,195 A | 10/1994 | Kanada | |
| 5,382,070 A * | 1/1995 | Turner | B62D 35/007 296/180.1 |
| 5,588,804 A | 12/1996 | Neely et al. | |
| 5,645,403 A | 7/1997 | Bogage | |
| 6,183,041 B1 | 2/2001 | Wilson | |
| 6,210,116 B1 | 4/2001 | Kuczaj et al. | |
| 6,494,673 B2 | 12/2002 | Choy et al. | |
| 6,692,232 B1 | 2/2004 | Letourneau | |
| 6,870,280 B2 | 3/2005 | Pechler | |
| 7,329,965 B2 | 2/2008 | Roberts et al. | |
| 7,390,163 B2 | 6/2008 | Clauson | |
| 7,435,051 B2 | 10/2008 | Obinelo et al. | |
| 7,494,325 B2 | 2/2009 | Gustafson et al. | |
| 7,695,242 B2 | 4/2010 | Fuller | |
| 8,091,951 B1 * | 1/2012 | Fitzgerald | B62D 35/001 296/180.1 |
| 8,118,560 B2 | 2/2012 | Takahashi et al. | |
| 8,402,742 B2 | 3/2013 | Roberge et al. | |
| 8,491,036 B2 * | 7/2013 | Henderson | B62D 35/02 296/180.4 |
| 8,500,291 B2 | 8/2013 | Wulff et al. | |
| 8,550,786 B2 | 10/2013 | Janiuk | |
| 8,667,773 B2 | 3/2014 | Silkowski | |
| 8,684,447 B2 * | 4/2014 | Henderson | B62D 35/001 296/180.4 |
| 8,733,954 B2 | 5/2014 | Wulff et al. | |
| 8,783,757 B2 * | 7/2014 | Henderson | B62D 35/00 296/180.4 |
| 8,789,365 B2 | 7/2014 | Maier | |
| 8,801,359 B2 | 8/2014 | Sherrer | |
| 8,973,974 B2 | 3/2015 | Kunkel | |
| 9,056,636 B2 | 6/2015 | Henderson et al. | |
| 9,205,778 B2 | 12/2015 | Henderson et al. | |
| 9,410,430 B2 | 8/2016 | Haskin | |
| 9,428,228 B2 | 8/2016 | Henderson et al. | |
| 9,534,608 B2 | 1/2017 | Gehlot et al. | |
| 9,616,945 B1 | 4/2017 | Henderson et al. | |
| 9,670,783 B2 | 6/2017 | Huebner et al. | |
| 9,682,735 B2 | 6/2017 | Bacon | |
| 9,695,799 B2 | 7/2017 | Aihara et al. | |
| 9,803,649 B2 | 10/2017 | Ragg et al. | |
| 10,030,520 B2 | 7/2018 | Duchene et al. | |
| 10,059,385 B1 | 8/2018 | Henderson et al. | |
| 10,415,543 B2 | 9/2019 | Nemoto | |
| 2003/0071485 A1 * | 4/2003 | Kazama | B62D 35/007 296/180.1 |
| 2006/0169847 A1 | 8/2006 | Konings | |
| 2006/0232102 A1 | 10/2006 | Steel | |
| 2006/0233647 A1 | 10/2006 | Saunders | |
| 2007/0224029 A1 | 9/2007 | Yokoi | |
| 2008/0093886 A1 * | 4/2008 | Nusbaum | B62D 35/001 296/180.1 |
| 2009/0167030 A1 | 7/2009 | Watkins | |
| 2009/0246027 A1 | 10/2009 | Johnson | |
| 2011/0057452 A1 | 3/2011 | Interlandi et al. | |
| 2011/0181072 A1 | 7/2011 | Kempster | |
| 2013/0076064 A1 * | 3/2013 | Smith | B62D 35/007 296/180.1 |
| 2013/0106136 A1 * | 5/2013 | Smith | B62D 35/001 296/180.4 |
| 2015/0008699 A1 * | 1/2015 | Yamaguchi | B62D 35/007 296/180.1 |
| 2015/0158439 A1 * | 6/2015 | Zha | B62D 35/00 296/1.03 |
| 2016/0016616 A1 * | 1/2016 | Bacon | B62D 35/001 296/180.4 |
| 2016/0031496 A1 * | 2/2016 | Zha | B60R 1/06 296/180.1 |
| 2016/0258442 A1 | 9/2016 | Helton et al. | |
| 2017/0334491 A1 * | 11/2017 | Dieckmann | B62D 35/001 |
| 2018/0093714 A1 * | 4/2018 | Chen | B62D 35/001 |
| 2018/0312203 A1 * | 11/2018 | Smith | B62D 35/001 |
| 2019/0084629 A1 * | 3/2019 | Prince | B60R 9/065 |
| 2019/0093629 A1 | 3/2019 | Juarez | |
| 2019/0202503 A1 | 7/2019 | Suk et al. | |
| 2020/0207426 A1 * | 7/2020 | Motter | B62D 35/001 |
| 2020/0270995 A1 | 8/2020 | Maar et al. | |
| 2020/0406988 A1 * | 12/2020 | Bradley | B62D 25/188 |
| 2021/0001929 A1 * | 1/2021 | Baxter | B62D 35/007 |
| 2021/0139084 A1 * | 5/2021 | Pan | B62D 37/02 |
| 2021/0403100 A1 * | 12/2021 | Hussein | B62D 35/001 |

FOREIGN PATENT DOCUMENTS

| | | |
|---|---|---|
| DE | 322283 C | 6/1920 |
| EP | 0076706 A1 | 4/1983 |
| WO | 2017156135 A1 | 9/2017 |
| WO | 2019133687 A1 | 7/2019 |

(56) References Cited

FOREIGN PATENT DOCUMENTS

OTHER PUBLICATIONS

Office Action dated Dec. 6, 2021 in Utility U.S. Appl. No. 17/008,846.
Notice of Preliminary Rejection dated Nov. 23, 2021 for Korean Patent Application No. 10-2020-7021710.
Extended European Search report dated Dec. 23, 2021 for European Patent Application No. 18894327.8.
Office Action dated Jan. 19, 2022 in Chinese Patent Application No. 2018800900887, and English translation thereof.

* cited by examiner

AIRFOILS AND MACHINES INCORPORATING AIRFOILS

CROSS-REFERENCE TO RELATED APPLICATIONS

The present application is a continuation of U.S. patent application Ser. No. 17/008,846, filed Sep. 1, 2020, and titled "Airfoils and Machines Incorporating Airfoils," which application is a continuation of U.S. patent application Ser. No. 15/969,347, filed May 2, 2018, and titled "Airfoils and Machines Incorporating Airfoils," which application claims priority to U.S. Provisional Application No. 62/611,890, filed Dec. 29, 2017, and titled "Airfoils and Machines Incorporating Airfoils," the entirety of each of these applications being herein incorporated by reference.

BACKGROUND OF THE INVENTION

The present invention relates generally to airfoils and machines including airfoils.

Airfoils produce an aerodynamic force as they move through a fluid, generating lift and drag. Subsonic flight airfoils may have a shape with a rounded leading edge and a sharp trailing edge. In some airfoils, the upper and lower surfaces may have similar curvature.

Airfoils may be used in a variety of machines including turbines, propellers, fans as well as other kinds of machines.

SUMMARY OF THE INVENTION

In one aspect, an airfoil includes a leading edge and a trailing edge, a suction side and a pressure side, a base portion including a first surface associated with the pressure side and a second surface associated with the suction side. The airfoil also includes an overhang portion that extends over some of the base portion and an elliptic portion connecting the base portion and the overhang portion adjacent the leading edge. The overhang portion is curved toward the second surface of the base portion.

In another aspect, an airfoil includes a leading edge and a trailing edge, a suction side and a pressure side, a leading airfoil portion including the leading edge and a trailing airfoil portion including the trailing edge. The leading airfoil portion includes a pressure side surface, a first elliptic surface, a suction side surface and a second elliptic surface. The first elliptic surface connects the pressure side surface with the suction side surface and the second elliptic surface connects the suction side surface with the suction side of the trailing airfoil portion. A thickness of the airfoil decreases from the leading airfoil portion to the trailing airfoil portion.

In another aspect, an airfoil for use with a motor vehicle trailer includes a base portion and an extended portion extending from the base portion. The base portion includes a lower periphery, a first surface and a second surface, where the first surface extends from the lower periphery to the extended portion and where the second surface extends from the lower periphery to the extended portion. The extended portion extends over the second surface.

Other systems, methods, features, and advantages of the invention will be, or will become, apparent to one of ordinary skill in the art upon examination of the following figures and detailed description. It is intended that all such additional systems, methods, features, and advantages be included within this description and this summary, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION

The embodiments disclose various airfoils and machines that use airfoils. As used herein, the term airfoil (or aerofoil)

is any structure with curved surfaces that produces an aerodynamic force when moved through a fluid. As used herein, the term "fluid" may refer to any Newtonian Fluid. In other embodiments, airfoils could be used with Non-Newtonian Fluids. As used herein, wings, blades (e.g., propeller blades, rotor blades, turbine blades), and sails comprise various kinds of airfoils.

An airfoil may include an upper or suction surface against which fluid flows at a relatively high velocity with low static pressure. An airfoil may also include a lower or pressure surface that has a high static pressure relative to the suction surface. Alternatively, the suction and pressure surfaces could be referred to as suction and pressure sides. The airfoil also includes a leading edge defined as the point at the front of the airfoil with maximum curvature. The airfoil also includes a trailing edge defined as the point at the rear of the airfoil with minimum curvature. In addition, a chord line of the airfoil refers to a straight line between the leading and trailing edges. Also, a mean camber line is the locus of points midway between the upper and lower surfaces and may or may not correspond with the chord line depending on the shape of the airfoil.

As used herein, an airfoil has a chord length defined as the length of the airfoil's chord line. In addition, the airfoil has a thickness defined as the distance between the upper and lower surfaces along a line perpendicular to the mean camber line. The width of an airfoil is taken in a direction perpendicular to both the chord line and the thickness.

Throughout the detailed description and claims the term "radius of curvature" is used. The radius of curvature is the reciprocal of the curvature at a particular location on a curve or two-dimensional surface. For a curve, the radius of curvature equals the radius of the circular arc that best approximates the curve at that point. In particular, it should be noted that the larger the radius of curvature of curve, the smaller the curvature (and vice versa).

Figure 1:
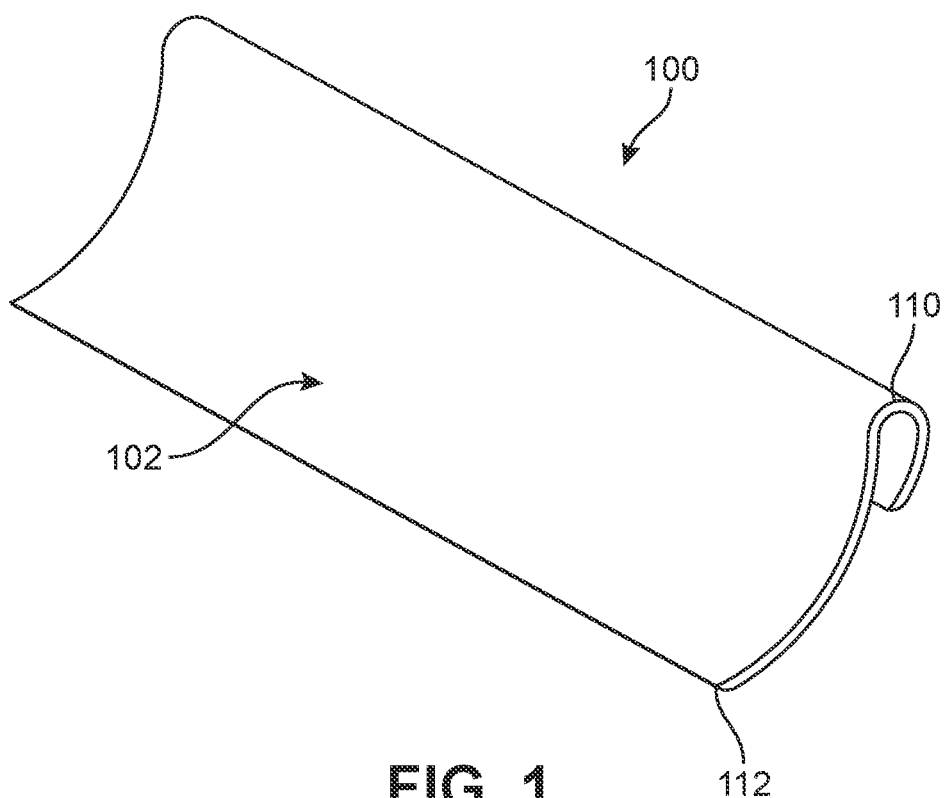
FIG. 1 is a schematic isometric view of an embodiment of an airfoil along the pressure side.
Figure 2:
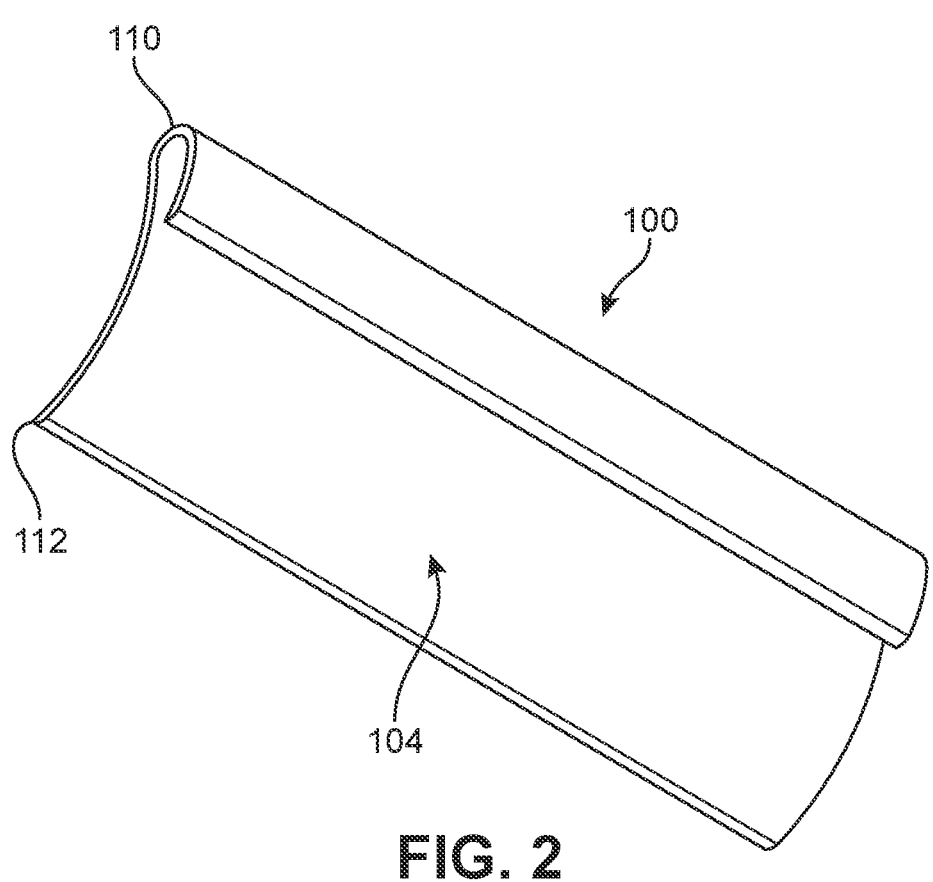
FIG. 2 is a schematic isometric view of a suction side of the airfoil of FIG. 1.
Figure 3:
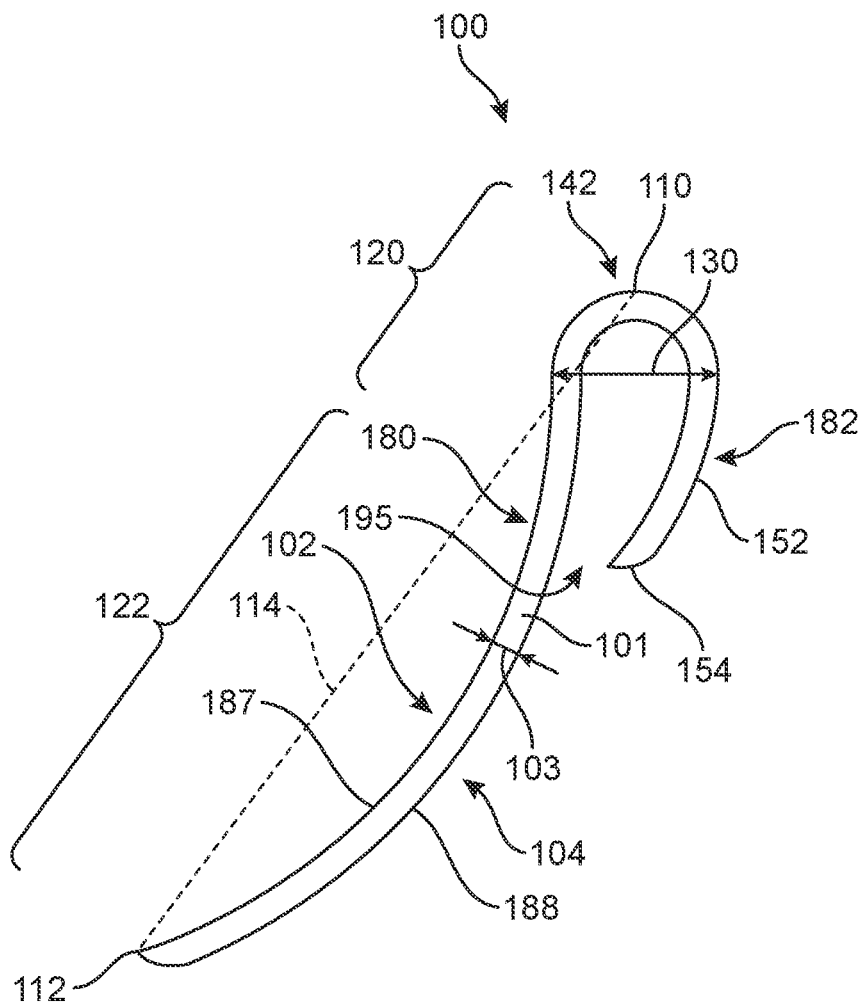
FIG. 3 is a schematic side view of an embodiment of an airfoil.

FIGS. 1-2 illustrate schematic isometric views of airfoil (or blade) 100, while FIG. 3 illustrates a schematic side view of airfoil 100. Referring to FIGS. 1-3, airfoil 100 is comprised of pressure side 102 (shown in FIG. 1) and opposing suction side 104 (shown in FIG. 2). Each of these sides includes a surface (e.g., a pressure surface or a suction surface) in contact with air during operation. Additionally, airfoil 100 includes leading edge 110 and trailing edge 112. Moreover, leading edge 110 and trailing edge 112 are connected by chord line 114 (see FIG. 3).

Referring to FIG. 3, in some embodiments, airfoil 100 may be comprised of a single body 101 of material. Starting from trailing edge 112, body 101 includes base portion 180 that is seen to curve gradually through the length of airfoil 100. Base portion 180 includes first surface 187 on pressure side 102 of airfoil 100 and opposing second surface 188 on opposing suction side 104.

At the end of base portion 180, body 101 bends to create a folded or hook-like section adjacent leading edge 110. That is, adjacent leading edge 110, body 101 is comprised of elliptic portion 142 as well as overhang portion 182 that hands or extends over some of base portion 180. Elliptic portion 142 connects base portion 180 and overhang portion 182 and also includes leading edge 110.

In some embodiments, overhang portion 182 may be spaced apart or separated from base portion 180. In the embodiment of FIG. 3, overhang portion 182 is separated from base portion 180 by gap 195. In different embodiments, the size of gap 195 may vary. In some cases, gap 195 may be greater than or equal to a thickness of overhang portion 182. In some cases, gap 195 may be at least three times as large as a thickness of overhang portion 182. Ensuring that gap 195 is sufficiently large and so that overhang portion 182 is sufficiently spaced apart from base portion 180 is important to facilitate desirable airflow behavior across airfoil 100 as discussed in further detail below.

The fold in body 101 adjacent leading edge 110 may be seen to divide airfoil 100 into two portions having distinctive geometries: leading airfoil portion 120 and trailing airfoil portion 122. Leading airfoil portion 120 is seen to comprise the leading segment of base portion 180, elliptic portion 142 and overhang portion 182. In contrast, trailing airfoil portion 122 comprises only the trailing segment of base portion 180.

In different embodiments, the length of leading airfoil portion relative to the overall length of the airfoil (that is, the percent of the total airfoil length that the overhang portion extends over) can vary. In some cases, the leading airfoil portion has a relative length of 25 to 50 percent of the total airfoil length. In one embodiment, the leading airfoil portion has a length of at least 25 percent of the total airfoil length. In yet another embodiment, the leading airfoil portion has a length of at least one third of the total airfoil length. In some cases, the leading airfoil portion may made sufficiently long enough (at least 25 percent or so of the total airfoil length) so that the first arc portion can be gradually curved down towards the second arc portion, thereby helping to keep the boundary layer attached to airfoil before the dramatic step down in thickness adjacent the second arc portion.

As seen in FIG. 3, body 101 has a relatively constant local thickness 103 throughout airfoil 100. However, the folded shape of body 101 that forms overhang portion 182 provides a greater overall thickness through leading airfoil portion 120 than in trailing airfoil portion 122. Here, the overall thickness is measured between opposing suction side 104 and pressure side 102 and is distinct from the local body thickness. Specifically, leading airfoil portion 120 has variable thickness 130 with a maximum value adjacent leading edge 110 and a minimum value at a location furthest from leading edge 110. In contrast, trailing airfoil portion 122 has an approximately constant thickness. In some embodiments, the thickness of trailing airfoil portion 122 is approximately equal to local thickness 103 of body 101. In other embodiments, trailing airfoil portion 122 could also have a variable thickness.

An airfoil may include provisions for keeping airflow "stuck" on the suction surface so that the air can be redirected through a large angle (e.g., from a near horizontal direction for incoming air to a near vertical direction for outgoing air). In some embodiments, an airfoil can include a leading airfoil portion that includes one or more of arcs for controlling the flow of air along a suction surface.

In some embodiments, overhang portion 182 may be further comprised of first arc portion 152 and second arc portion 154. First arc portion 152 may extend from elliptic portion 142, while second arc portion 154 may be disposed at an open or free end of overhang portion 182. In some embodiments, the curvature (along opposing suction side 104) of overhang portion 182 may vary from first arc portion 152 to second arc portion 154. In some cases, first arc portion 152 may be configured to curve down in the direction of base portion 180. Moreover, second arc portion 154 may be configured with steeper curvature that is also directed downwardly toward base portion 180.

In the following description the radius of curvature of various surfaces is defined relative to the length of a unit radius, denoted as "UN". In different embodiments, the particular value of the length of the unit radius could vary.

For example, the unit radius could have a length of 100 mm (i.e., 1 UN=100 mm), 6 inches (i.e., 1 UN=6 inches), or any other value. It may be understood that the ratio of two radii of curvature is independent of the particular value of the unit radius. Thus, if a first surface has a radius of curvature of 1 UN and a second surface has a radius of curvature of 0.5 UN, the ratio is equal to 1 divided by 0.5, or 2, and is a dimensionless quantity that is independent of the particular length of the unit radius in a given embodiment.

Figure 4:
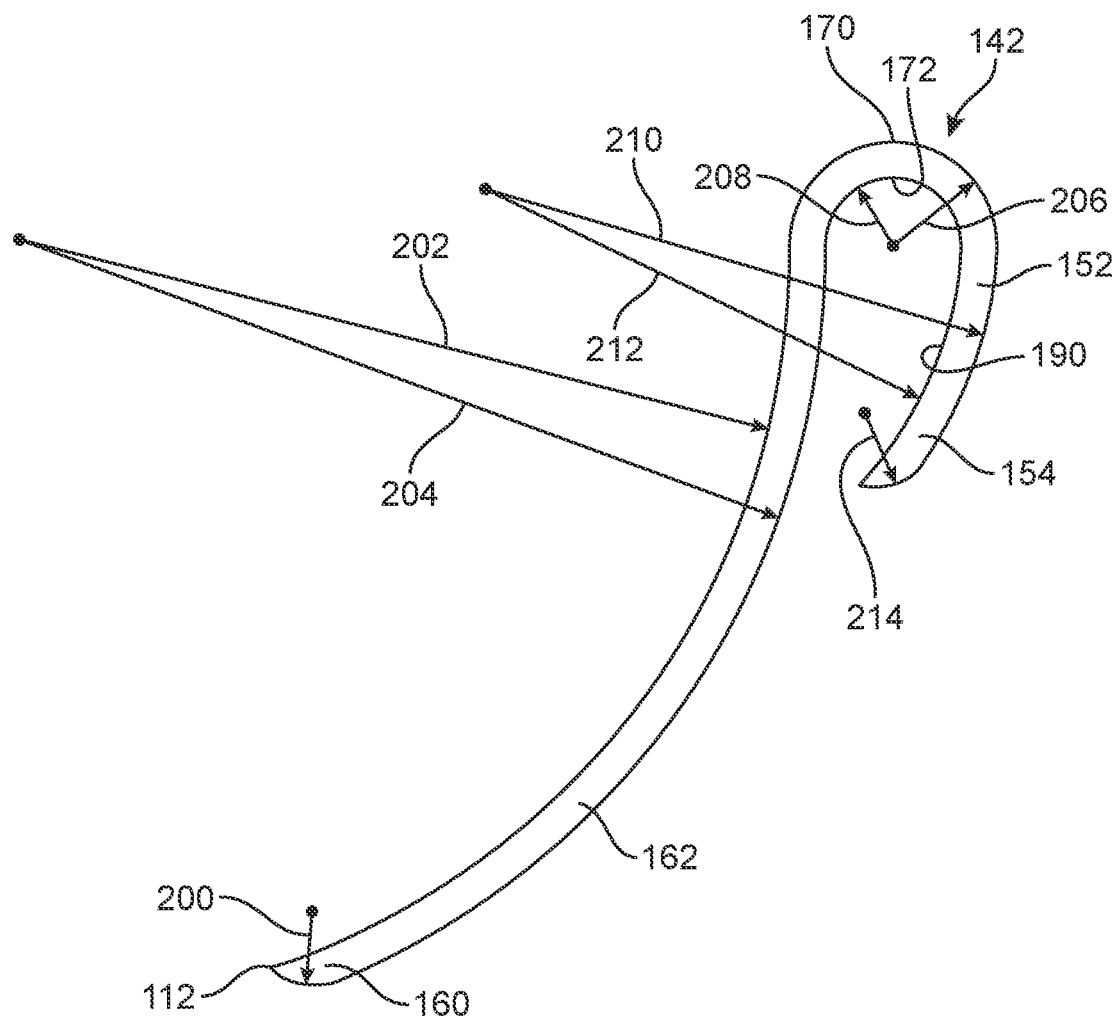
FIG. 4 is a schematic side view of the airfoil of FIG. 3, in which the curvature of various portions of the airfoil are indicated.

FIG. 4 is a schematic side view of airfoil 100. Referring to FIG. 4, the different portions or segments of airfoil 100 can have different degrees of curvature. In some embodiments, trailing airfoil portion 122 has trailing arc portion 160 immediately adjacent trailing edge 112. Trailing arc portion 160 has radius of curvature 200. In some cases, radius of curvature 200 could have a value of approximately 0.1000 UN. In some embodiments, main segment 162 of trailing airfoil portion 122 has radius of curvature 202 along pressure side 102 and radius of curvature 204 along opposing suction side 104. In some cases, radius of curvature 202 has a value of approximately 1.1250 UN. In some cases, radius of curvature 204 has a value of approximately 1.1750 UN. In some embodiments, elliptic portion 142 has radius of curvature 206 on outward facing side 170 and radius of curvature 208 on inward facing side 172. In some cases, radius of curvature 206 has a value of approximately 0.1500 UN. In some cases, radius of curvature 208 has a value of approximately 0.1000 UN.

In some embodiments, first arc portion 152 has radius of curvature 210 along opposing suction side 104 and radius of curvature 212 along inward facing surface 190. In some cases, radius of curvature 210 has a value of approximately 0.7500 UN. In some cases, radius of curvature 212 has a value of approximately 0.7000 UN. In addition, second arc portion 154 has radius of curvature 214. In some cases, radius of curvature 214 has a value of approximately 0.1000 UN.

In some embodiments, the curvature of each segment of airfoil 100 may be selected to help keep the boundary layer of flowing air attached to opposing suction side 104, even as airfoil 100 curves from leading edge 110 to trailing edge 112.

Figure 5:
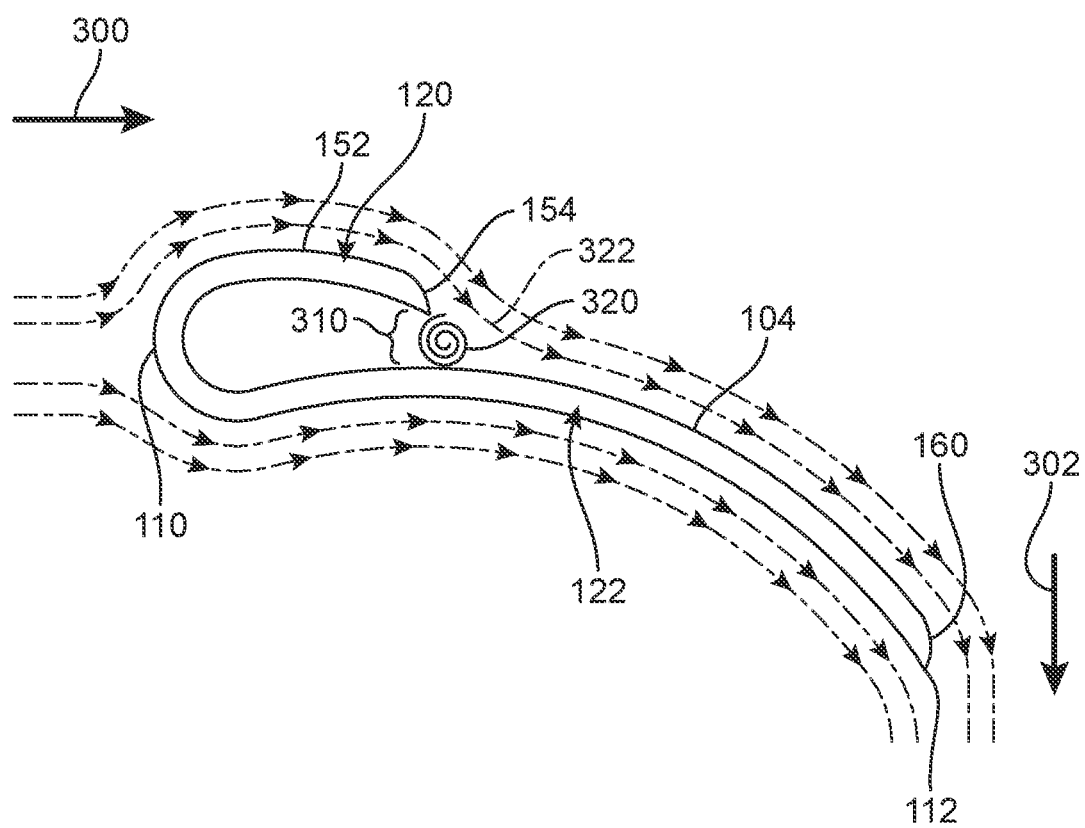
FIG. 5 is a schematic view of an embodiment of an airfoil indicating pathlines of airflow elements.

FIG. 5 is a schematic view of airfoil 100 in operation as air passes across it. Referring to FIG. 5, incoming air flows in an approximately horizontal direction 300 and encounters leading edge 110 first. Air moving across opposing suction side 104 will first pass across first arc portion 152, which curves down to second arc portion 154. Air then gets directed down into trailing airfoil portion 122. As the air flows along trailing airfoil portion 122, it is directed down to trailing arc portion 160 and turns downwardly as it leaves trailing edge 112.

The geometry of leading airfoil portion 120 creates step-down region 310 resulting in an abrupt change in thickness between leading airfoil portion 120 and trailing airfoil portion 122. This sudden change in thickness (and geometry) creates vortex 320 (and/or turbulent eddies) at step-down region 310. As air flows over opposing suction side 104, vortex 320 "pulls" the air down and thereby reattaches the boundary layer of the flow as it moves from one section to the next, keeping the air "stuck" on opposing suction side 104.

The embodiments utilize specifically curved arc portions adjacent step-down region 310 to help actively control the turbulent eddies or vortices that develop at step-down region 310. Specifically, first arc portion 152 and second arc portion 154 combine to actively redirect the fluid flow with use of the Coanda effect toward reattachment to the airfoil upper surface. The Coanda effect refers to the tendency of a jet of fluid emerging from an orifice to follow an adjacent flat or curved surface and to entrain fluid from the surroundings so that a region of lower pressure develops. Vortex 320 (and/or turbulent eddies) at step-down region 310 creates a pressure difference between second arc portion 154 and trailing airfoil portion 122. The active fluid flowing across opposing suction side 104 creates air curtain 322 (via the Coanda effect) that helps hold vortex 320 in place and keeps it attached to opposing suction side 104. Air curtain 322 thus provides a stabilizing force to keep vortex 320 in place, which further serves to prevent the boundary layer from delaminating from airfoil 100.

This arrangement provides an airfoil that keeps the airflow stuck to opposing suction side 104 enough to turn the airflow direction by close to 90 degrees. That is, air initially flowing in horizontal direction 300 as it encounters leading edge 110 leaves trailing edge 112 traveling in second direction 302. In some cases, second direction 302 is a near vertical direction. In other embodiments, depending on the shape and local curvature of various segments of airfoil 100, the direction of incoming air could be changed by any amount between approximately 10 and 90 degrees.

Figure 6:
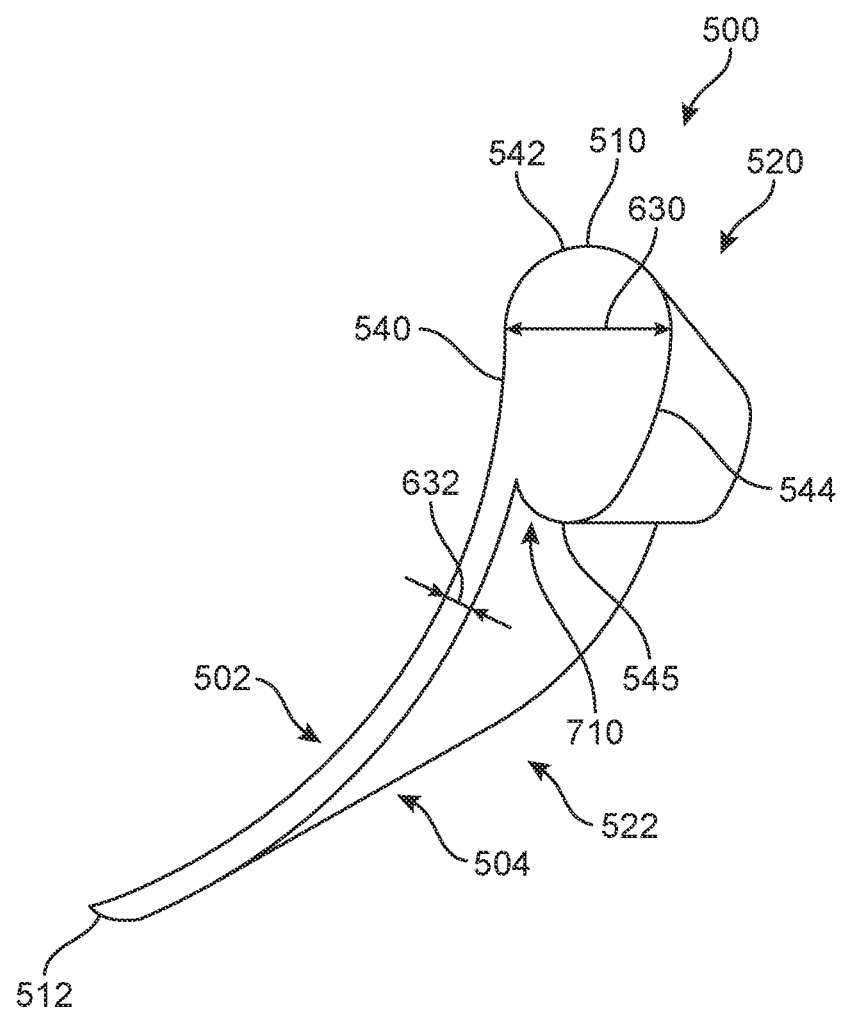
FIG. 6 is a schematic isometric view of another embodiment of an airfoil.

FIG. 6 illustrates a schematic isometric view of another embodiment of airfoil (or blade) 500. In contrast to the open-ended or folded configuration of airfoil 100, airfoil 500 has a solid geometry. Referring to FIG. 6, airfoil 500 is comprised of opposing pressure side 502 and suction side 504. Additionally, airfoil 500 includes leading edge 510 and trailing edge 512.

Airfoil 500 may be further characterized as comprising leading airfoil portion 520 and trailing airfoil portion 522. Starting from trailing edge 512, airfoil 500 is seen to curve gradually through trailing airfoil portion 522.

An airfoil may include provisions for keeping airflow "stuck" on the suction surface and allowing air to be redirected through a large angle. In some embodiments, an airfoil can include a leading airfoil portion that includes a series of arcs for controlling the flow of air along a suction surface.

As seen in FIG. 6, leading airfoil portion 520 is comprised of pressure side surface 540, first elliptic surface 542, suction side surface 544, and second elliptic surface 545. Pressure side surface 540 extends from trailing airfoil portion 522 to first elliptic surface 542. First elliptic surface 542 extends around from opposing pressure side 502 to suction side 504 and includes leading edge 510. Suction side surface 544 curves down toward pressure side surface 540. Second elliptic surface 545 then curves down in a convex manner and connects with trailing airfoil portion 522. In contrast to the open region created by the fold in airfoil 100, the design shown in FIG. 6 provides step-down region 710 with a solid, continuous and convex surface. Moreover, as in the previous embodiment, the overall thickness 630 of leading airfoil portion 520 is greater than thickness 632 of trailing airfoil portion 522.

Figure 7:
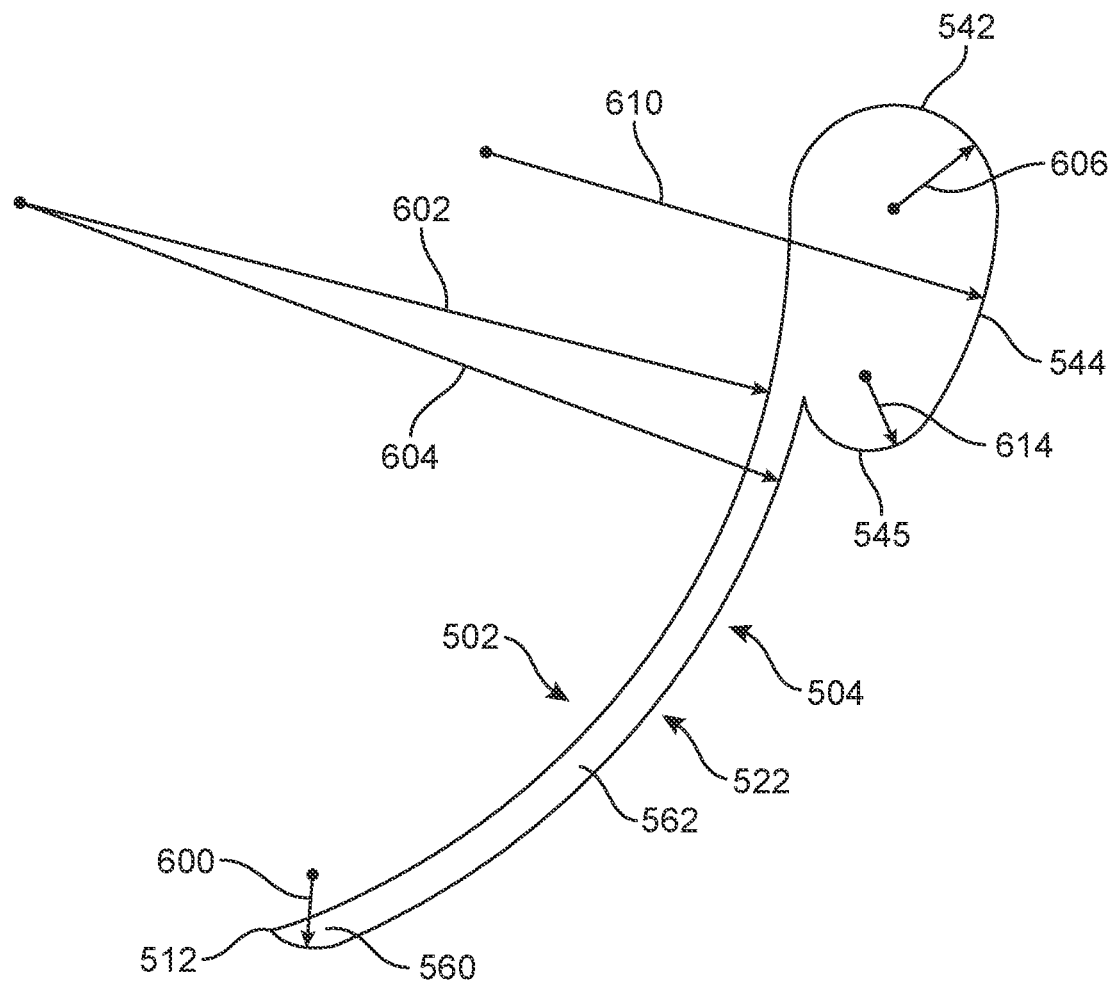
FIG. 7 is a schematic side view of the airfoil of FIG. 6, in which the curvature of various portions of the airfoil are indicated.

FIG. 7 is a schematic side view of airfoil 500. Referring to FIG. 7, the different portions or segments of airfoil 500 can have different degrees of curvature. In some embodiments, trailing airfoil portion 522 has arc portion 560 immediately adjacent trailing edge 512. Arc portion 560 has radius of curvature 600. In some cases, radius of curvature 600 could have a value of approximately 0.1000 UN. In some embodiments, main segment 562 of trailing airfoil portion 522 has radius of curvature 602 along opposing pressure side 502 and radius of curvature 604 along suction side 504. In some cases, radius of curvature 602 has a value of approximately 1.1250 UN. In some cases, radius of curvature 604 has a value of approximately 1.1750 UN. In some embodiments, first elliptic surface 542 has radius of curvature 606. In some cases, radius of curvature 606 has a value of approximately 0.1500 UN.

In some embodiments, suction side surface 544 has radius of curvature 610. In some cases, radius of curvature 610 has a value of approximately 0.7500 UN. In addition, second elliptic surface 545 has radius of curvature 614. In some cases, radius of curvature 614 has a value of approximately 0.1000 UN.

In some embodiments, the curvature of each segment of airfoil 500 may be selected to help keep the boundary layer of flowing air attached to suction side 504, even as airfoil 500 curves from leading edge 510 to trailing edge 512.

Figure 8:
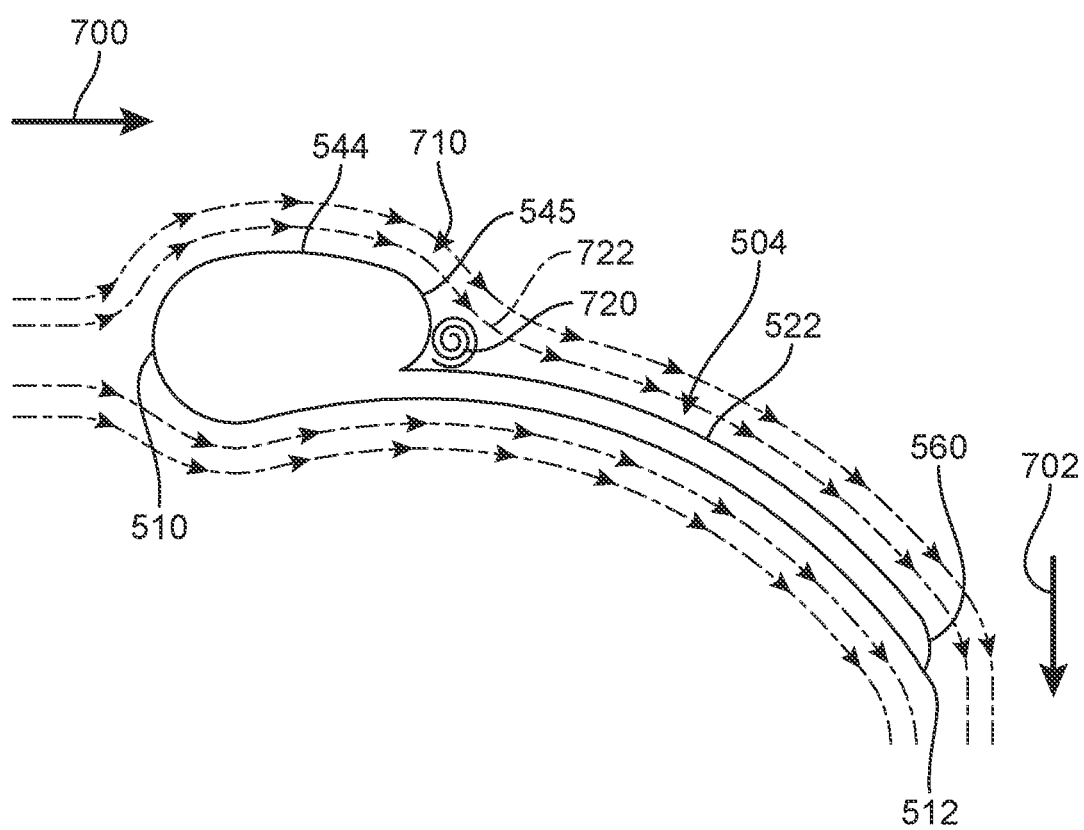
FIG. 8 is a schematic view of an embodiment of an airfoil indicating pathlines of airflow elements.

FIG. 8 is a schematic view of airfoil 500 in operation as air passes across it. Referring to FIG. 8, incoming air flows in an approximately horizontal direction 700 and encounters leading edge 510 first. Air moving across suction side 504 will first pass across suction side surface 544, which curves down to second elliptic surface 545. Air then gets directed down into trailing airfoil portion 522. As the air flows along trailing airfoil portion 522, it is directed down to arc portion 560 and turns downwardly as it leaves trailing edge 512.

The geometry of leading airfoil portion 520 creates step-down region 710, resulting in an abrupt change in thickness between leading airfoil portion 520 and trailing airfoil portion 522. This sudden change in thickness (and geometry) creates vortex 720 (and/or turbulent eddies) at step-down region 710. As air flows over suction side 504, vortex 720 "pulls" the air down and thereby reattaches the boundary layer of the flow as it moves from one section to the next, keeping the air "stuck" on suction side 504.

The embodiments utilize specifically curved arc and/or elliptic surfaces adjacent step-down region 710 to help actively control the turbulent eddies or vortices that develop at step-down region 710. Specifically, suction side surface 544 and second elliptic surface 545 combine to actively redirect the fluid flow with use of the Coanda effect toward reattachment to the airfoil upper surface. Vortex 720 (and/or turbulent eddies) at step-down region 710 creates a pressure difference between elliptic surface 545 and trailing airfoil portion 522. The active fluid flowing across suction side 504 creates air curtain 722 (via the Coanda effect) that helps hold vortex 720 in place and keeps it attached to suction side 504. Air curtain 722 thus provides a stabilizing force to keep vortex 720 in place, which further serves to prevent the boundary layer from delaminating from airfoil 500.

As with the embodiment of airfoil 100, this arrangement provides an airfoil that keeps the airflow stuck to suction side 504 enough to turn the airflow direction by close to 90 degrees. That is, airflow initially flowing in horizontal direction 700 as it encounters leading edge 510 leaves trailing edge 512 traveling in second direction 702. In some cases, second direction 702 is a near vertical direction. In other embodiments, depending on the shape and local curvature of various segments of airfoil 500, the direction of incoming air could be changed by any amount between approximately 10 and 90 degrees.

The embodiments of airfoils discussed above, including airfoil 100 and airfoil 500 may be used in a variety of different applications. In some embodiments, airfoils may be used to direct airflow around edges of a motor vehicle, such as the rear edges. The disclosed airfoils could be used with a variety of different kinds of motor vehicles, including tractor trailers, truck cabs, and other trucks as well as SUV's, sedans, coupes, and other cars. It may be appreciated that airfoils could also be used with any other kind of motor vehicle such as motorcycles, ATVs, and snowmobiles.

The following shows exemplary machines and devices utilizing an airfoil with a folded end similar to airfoil 100. However, it may be understood that in other embodiments airfoils with a solid end similar to airfoil 500 could also be integrated into any of these same machines and devices.

Figure 9:
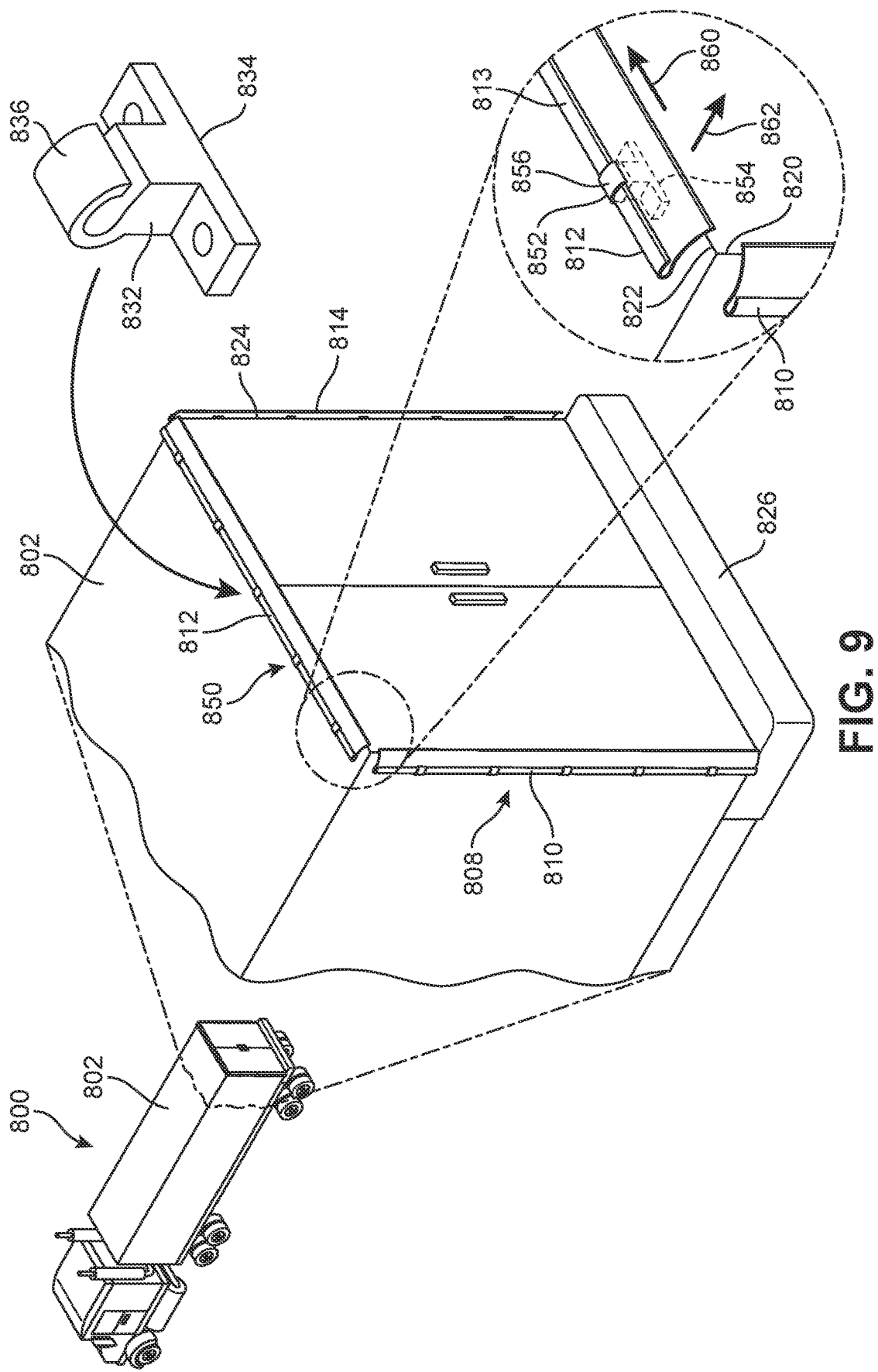
FIG. 9 is a schematic view of an embodiment of a motor vehicle including a set of airfoils.

In one exemplary application, depicted in FIG. 9, set of airfoils 808 may be used to direct airflow around the back of motor vehicle 800. In the exemplary embodiment, motor vehicle 800 is a tractor trailer with trailer 802. The rear end of trailer 802 includes first airfoil 810, second airfoil 812, and third airfoil 814 that are arranged along driver side rearward edge 820, top rearward edge 822, and passenger side rearward edge 824 of trailer 802, respectively. In other embodiments, airfoils could be used along only one edge, only two edges, and/or along four edges. In some cases, for example, an airfoil could be positioned along lower rearward edge 826 of trailer 802.

In contrast to the design of airfoil 100 and airfoil 500, the airfoils in set of airfoils 808 may be elongated such that a single airfoil extends the full length of each edge. Depending on the dimensions of motor vehicle 800, the width of the airfoil could range between 2 to 10 feet. In still other cases, the airfoils could be located along some portions of an edge but not others. In such cases, airfoils could have a width of substantially less than 2 feet. In still other applications for larger trucks or machines, an airfoil could have a width of greater than 10 feet.

In different embodiments, any means for attaching an airfoil to the edge of a motor vehicle could be used. In some embodiments, fasteners, adhesives, welds, or other means can be used to secure an airfoil to a vehicle. In other embodiments, an airfoil could be attached using tool-less means, such as magnets or double-sided tape.

In one embodiment, an airfoil system for a motor vehicle uses a series of mounts 850 to attach set of airfoils 808 to motor vehicle 800. The mounts may be configured to retain the airfoil without fasteners or other direct connections, instead relying on a locking "fit" between the mount and airfoil. While the present embodiment depicts approximately 4-6 mounts per edge to secure a single airfoil, in other embodiments the number and spacing of mounts could be varied.

For example, FIG. 9 includes an enlarged isolated view of one mount 852 that helps retain second airfoil 812. Mount 852 includes based portion 854 that can be fastened directly to motor vehicle 800. Mount 852 also includes retaining portion 856 that is shaped to receive leading airfoil portion 813 of second airfoil 812.

In some embodiments, retaining portion 856 has a hook-like geometry that allows leading airfoil portion 813 to slide into place along mounting direction 860 while restricting leading airfoil portion 813 from sliding out along perpendicular direction 862. In some embodiments, the ends or other portions of an airfoil could be fixed into place to prevent the airfoil from sliding along mounting direction 860 during operation of motor vehicle 800.

For clarity, second mount 832 is shown in isolation in FIG. 9, and includes a similar base portion 834 and retaining portion 836 so that the geometry of the mount can be more clearly seen.

Figure 10:
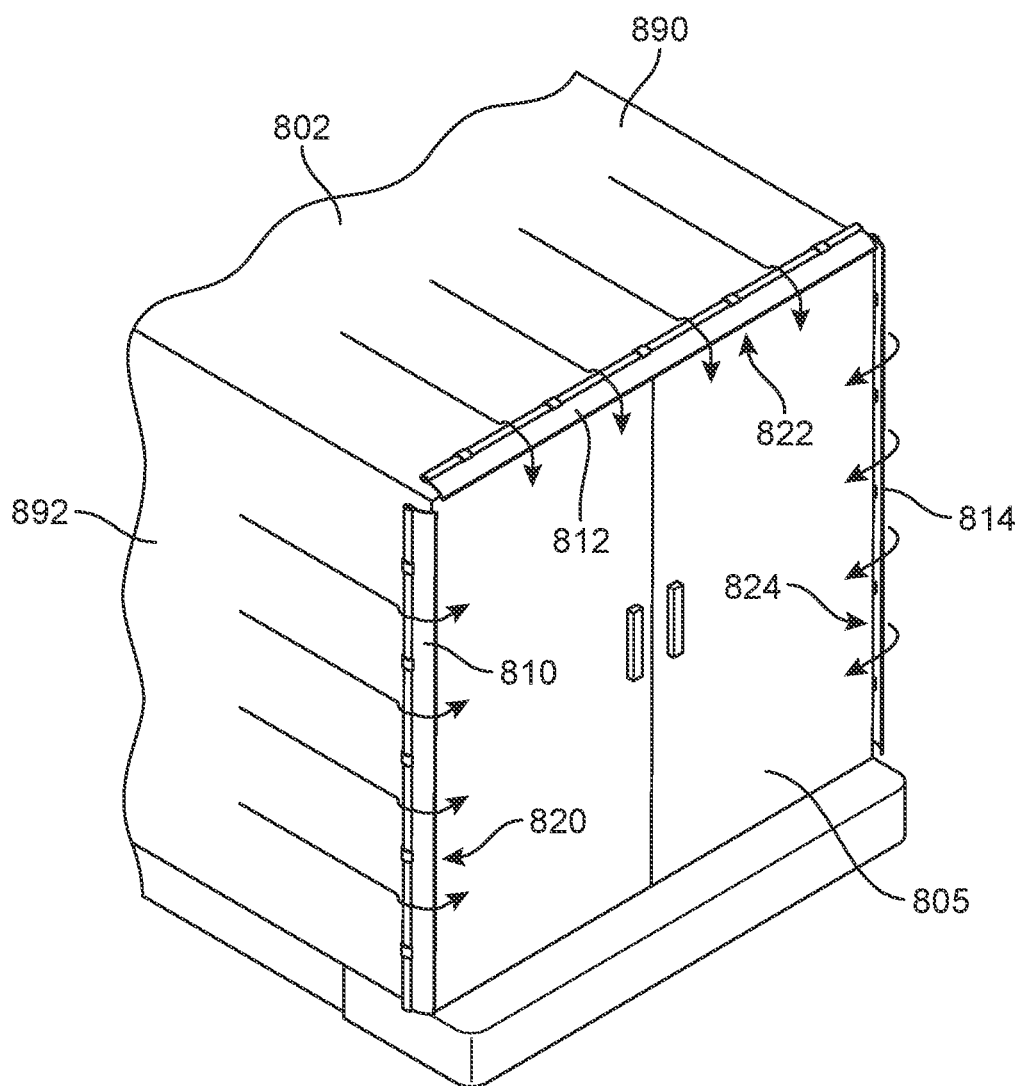
FIG. 10 is a schematic view of a rear portion of the motor vehicle of FIG. 9, in which pathlines of fluid elements are indicated.

In operation, the use of airfoils along one or more edges allows air to fill in the void created by the moving trailer, thereby reducing drag. As seen in FIG. 10, air flowing horizontally across top surface 890 and side surfaces 892 of trailer 802 may be turned around each of edge 820, edge 822, and edge 824 by corresponding airfoils. In some cases, the air turns through an angle of near 90 degrees so that it flows nearly parallel with rearward side 805 of trailer 802. The air then collects immediately behind motor vehicle 800 where a void would otherwise form.

Figure 11:
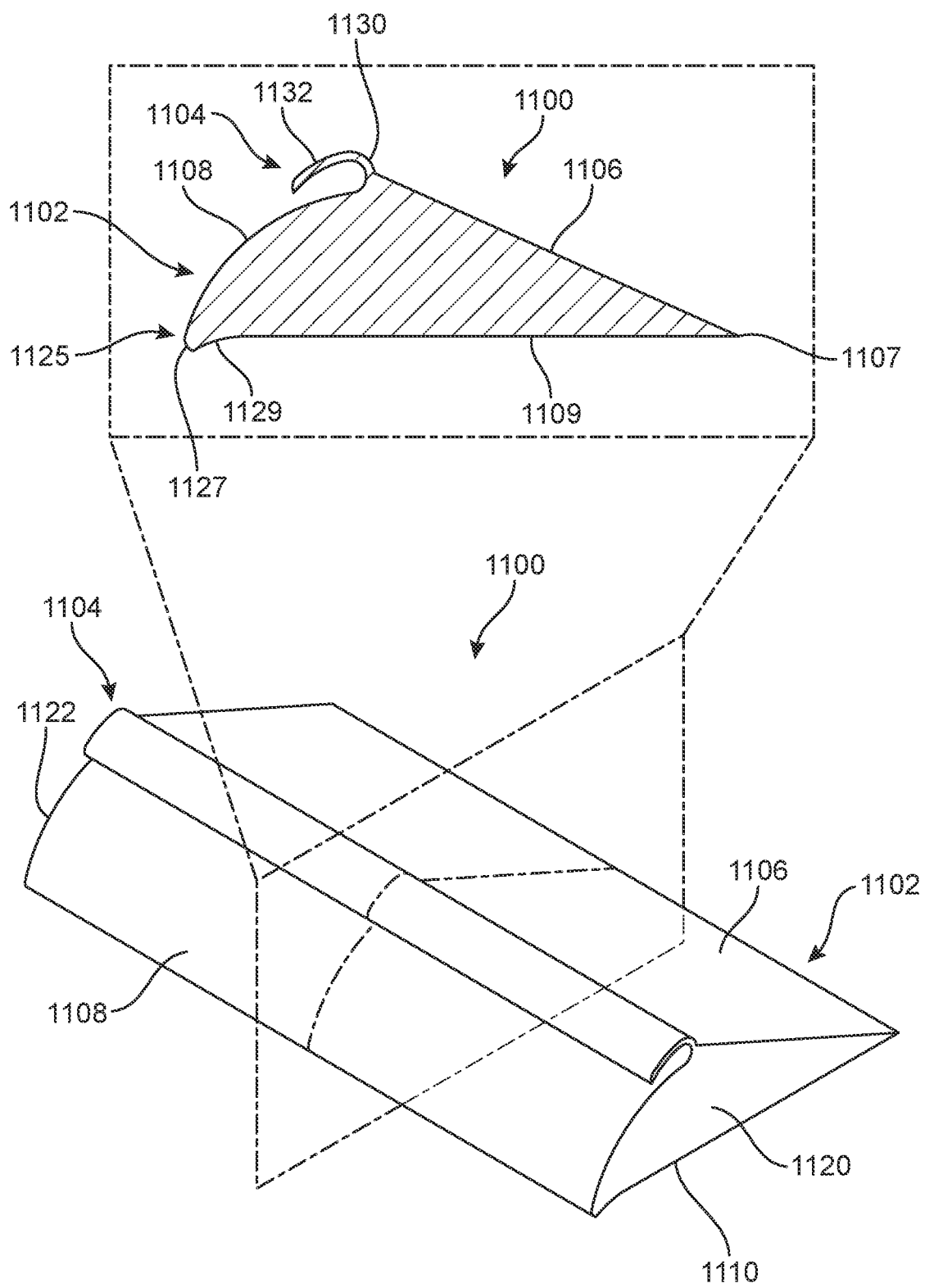
FIG. 11 is a schematic view of another embodiment of an airfoil.

FIGS. 11-14 illustrate schematic views of another embodiment of airfoils that may be attached to a truck, or other vehicle, to help direct air around the back of the truck and reduce drag. In FIG. 11, a first airfoil 1100 (or simply, "airfoil 1100") is depicted in isolation. For clarity, an enlarged cross-sectional view of airfoil 1100 is also shown in FIG. 11.

Airfoil 1100 may comprise a base portion 1102 and an extended portion 1104 that extends from base portion 1102. Base portion 1102 may comprise a first surface 1106 and a second surface 1108, which both extend from a lower periphery 1110 of base portion 1102 up towards extended portion 1104. More specifically, both first surface 1106 and second surface 1108 slope upwardly and inwardly from their respective edges along lower periphery 1110, with each surface extending continuously with extended portion 1104. Additionally, a third surface 1120 and an opposing fourth surface 1122 also extend upwardly from lower periphery 1110 to extended portion 1104. Third surface 1120 and fourth surface 1122 each comprise three edges giving them an approximately triangular geometry. Optionally, in some embodiments, third surface 1120 and fourth surface 1122 may be absent, for example in an embodiment where airfoil 1100 has a hollow interior. Such an embodiment is depicted, for example, in FIGS. 15 and 16 and discussed in further detail below.

In some embodiments, base portion 1102 may further comprise a lower surface 1109 that joins one or more of first surface 1106, second surface 1108, third surface 1120 and fourth surface 1122 along lower periphery 1110. However, in embodiments where base portion 1102 may have a fully, or partially, hollow interior, a lower surface may be optional.

In some embodiments, the geometry of base portion 1102 may be approximately similar to a triangular prism, with first surface 1106, second surface 1108 and lower surface 1109 each comprising faces of a prism with four edges and with third surface 1120 and fourth surface 1122 comprising faces of the prism with three edges. Moreover, extended portion 1104 may be seen to extend along one of the edges of the prism that connects the opposing triangular surfaces (i.e., third surface 1120 and fourth surface 1122). Of course, it may be appreciated that the geometry of base portion 1102 may vary from that of a prism, with some surfaces (or faces) being curved rather than planar, for example.

Airfoil 1100 may have a geometry that is similar in some respects to airfoil 100. For example, as best seen in the cross-sectional view of FIG. 11, the profile of second surface 1108 and its continuation with extended portion 1104 may have a substantially similar profile to that of airfoil 100, as depicted, for example, in FIGS. 3-5.

As best seen in the cross-sectional view of FIG. 11, extended portion 1104 has a geometry similar to portions of airfoil 100. Specifically, extended portion 1104 may comprise an elliptic portion 1130 and an overhang portion 1132, similar in geometry to those same components in airfoil 100 (i.e., elliptic portion 142 and overhang portion 182). Overhang portion 1132 may be disposed over (i.e., face) a portion of second surface 1108. Overhang portion 1132 may also curve towards second surface 1108.

It may be appreciated that in some embodiments, the respective curvatures of the inner and outer surfaces of elliptic portion 1130 and overhang portion 1132 could be similar to the respective curvatures of elliptic portion 142 and overhang portion 182. Specifically, overhang portion 1132 may further include a first arc portion and a second arc portion with different curvatures that help prevent the boundary layer of airflow from delaminating from airfoil 1100 as air passes across extended portion 1104 and is directed towards second surface 1108.

First surface 1106 is sloped up towards extended portion 1104 along a first side of airfoil 1100, while second surface 1108 is sloped up towards extended portion 1104 along a second side of airfoil 1100. In use, air may flow up first surface 1106, around extended portion 1104 and back down second surface 1108, as discussed in further detail below. The geometry of each surface may be selected to best facilitate turning the direction of airflow that passes across the airfoil (i.e., from a near horizontal direction to a near vertical direction). In one embodiment, first surface 1106 has an approximately flat geometry with a constant slope that acts to direct horizontally moving air up towards extended portion 1104 of airfoil 1100. Also, second surface 1108 has a curved geometry that is similar to the curved geometry of suction side 104 of airfoil 100 to help change the direction of airflow.

In some embodiments, second surface 1108 curves down below the lower edges of the other remaining surfaces of base portion 1102 (e.g., below a lower edge 1107 of first surface 1106). This creates a turned down portion 1125 of airfoil 1100, including a lower elliptic portion 1127 and a lower side surface 1129 that extends from lower elliptic portion 1127 up to a position at a similar horizontal level to lower edge 1107. In use, this turned down portion may be arranged to extend out and over a rearward edge on a trailer.

Figure 12:
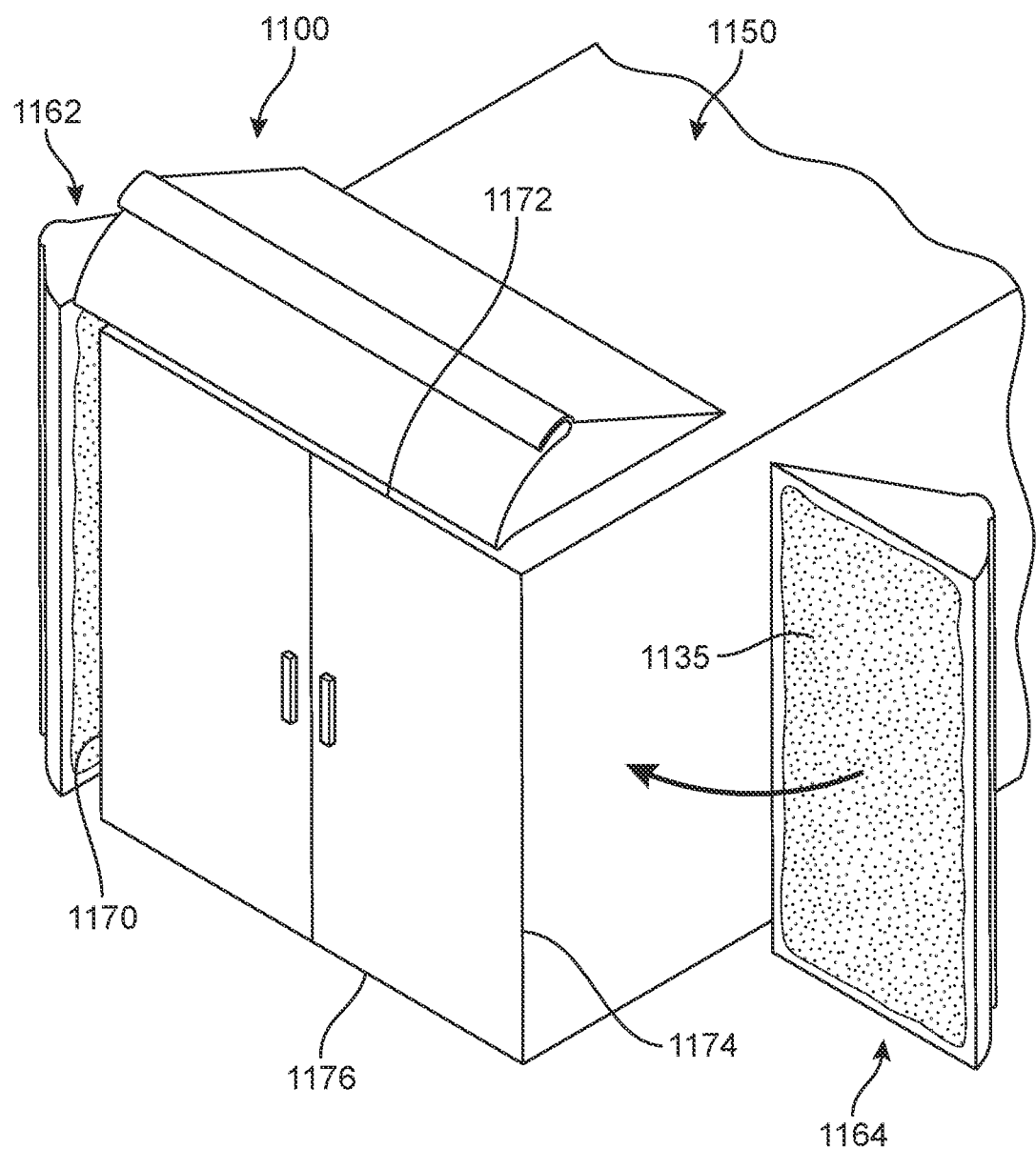
FIG. 12 is a schematic view of an embodiment of a set of airfoils associated with a trailer.
Figure 13:
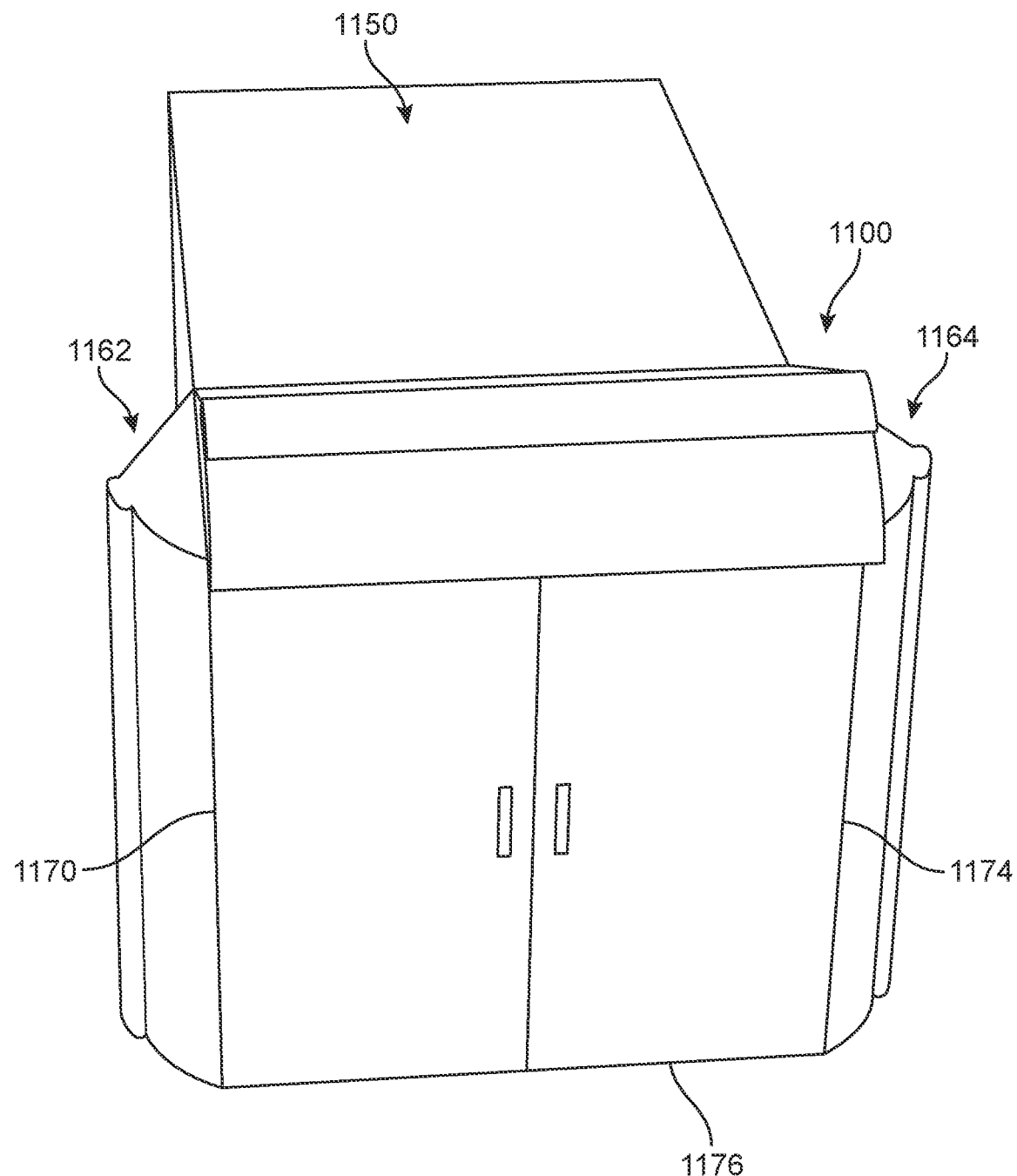
FIG. 13 is a schematic view of the set of airfoils in FIG. 12 attached to the trailer.

FIGS. 12 and 13 are schematic isometric views of a set of airfoils and a rearward portion of a trailer 1150 for a truck or other vehicle. Specifically, FIG. 12 depicts a set of airfoils prior to attachment to trailer 1150, while FIG. 13 depicts a configuration where the entire set of airfoils have been attached.

Referring to FIGS. 12-13, the set of airfoils includes first airfoil 1100, second airfoil 1162 and third airfoil 1164. Each airfoil may be associated with a specific rearward edge of trailer 1150. In the exemplary embodiment, first airfoil 1100, second airfoil 1162, and third airfoil 1164 are arranged along top rearward edge 1172, driver side rearward edge 1170, and passenger side rearward edge 1174 of trailer 1150, respectively. In other embodiments, airfoils could be used along only one edge, only two edges, and/or along four edges. In some cases, for example, an airfoil could be positioned along lower rearward edge 1176 of trailer 1150.

As seen in FIGS. 12-13, in some embodiments, second airfoil 1162 and third airfoil 1164 could have different geometries. In particular, second airfoil 1162 and third airfoil 1164 could have geometries similar to the geometries of airfoil 1200 which is discussed below and shown in FIGS. 14-15. Alternatively, in some embodiments, each of the airfoils could have a substantially similar geometry.

Figure 14:
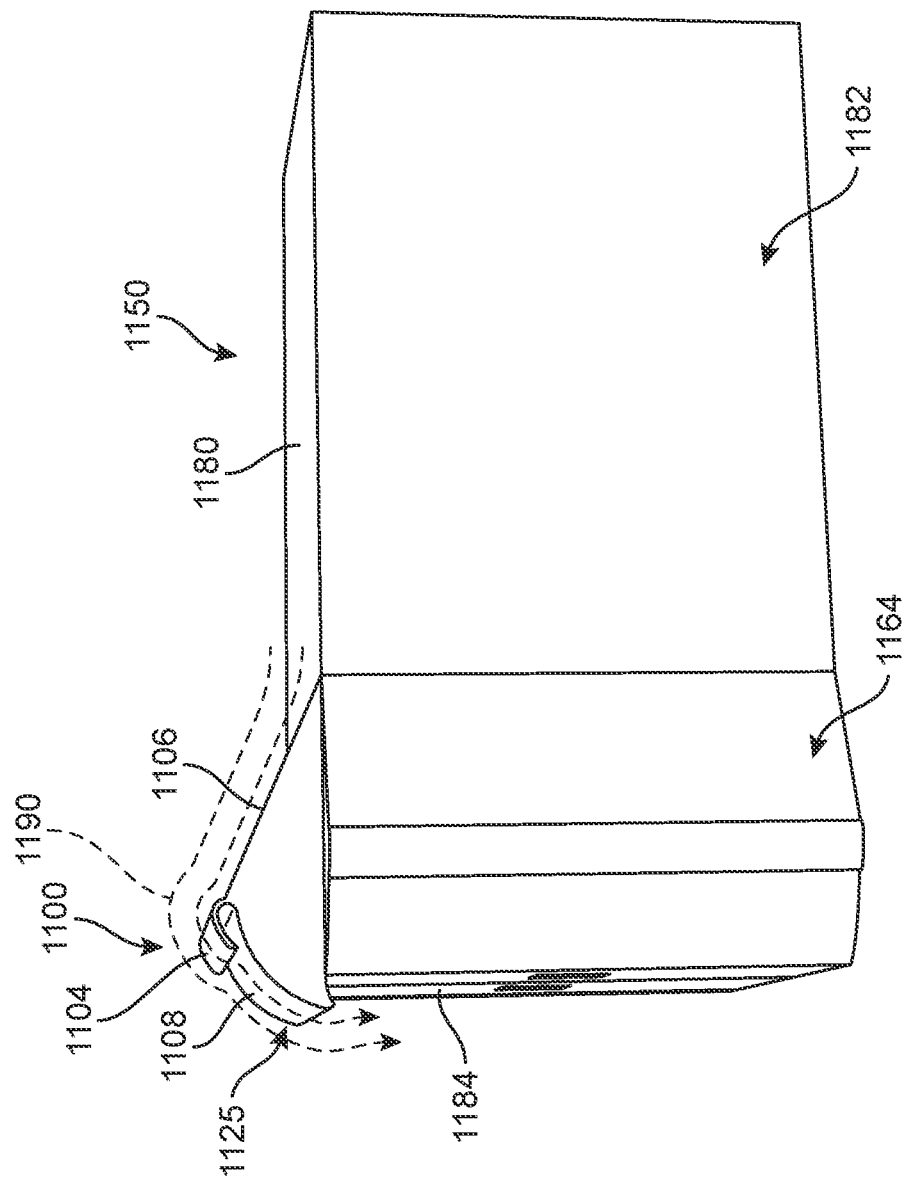
FIG. 14 is a schematic view of a set of airfoils attached to a trailer, in which the direction of airflow around one of the airfoils is indicated schematically, according to an embodiment.

In operation, the use of airfoils along one or more edges allows air to fill in the void created by the moving trailer, thereby reducing drag. As seen in FIG. 14, another schematic view of trailer 1150 with the attached set of airfoils 1160, air flowing horizontally across top surface 1180 and side surfaces 1182 of trailer 1150 may be turned around each of edge 1170, edge 1172, and edge 1174 by corresponding airfoils.

Considering airflow across airfoil 1100 as a specific example, airflow 1190 may be directed from a near horizontal direction up along first surface 1106 towards extended portion 1104. At extended portion 1104, the airflow turns and is directed back down second surface 1108. In some cases, the air turns through an angle of approximately 90 degrees so that it flows approximately parallel with rearward side 1184 of trailer 1150. The air then collects behind trailer 1150 where a void would otherwise form.

As seen in FIG. 14, turned down portion 1125 of airfoil 1100 may extend rearwards of, and below, top rearward edge 1172 (see FIG. 12) of trailer 1150. In the exemplary embodiment depicted in FIG. 14, second airfoil 1162 (see FIG. 13) and third airfoil 1164 are seen to be approximately flush with driver side rearward edge 1170 and passenger side rearward edge 1172, respectively. That is, these airfoils may not include turned portions that extend past the rearward edges of trailer 1150. Instead, the lower peripheral edges of these airfoils may generally lie in the same plane of the rear side of the trailer. In some cases, this may help ensure doors on the trailer have adequate clearance to open.

Different embodiments may use different methods for attaching airfoil 1100 to trailer 1150. In the exemplary embodiment depicted in FIG. 12, an adhesive 1135 is used to bond airfoil 1164 to trailer 1150. Exemplary adhesives that could be used include, but are not limited to: epoxy, silicone, cyanoacrylate and UV cure adhesives. The type of adhesive used may be selected according to the material properties of trailer 1150 and/or airfoil 1100. In some cases, an adhesive may be selected that facilitates bonding between plastic (the airfoil) and metal (the trailer). It may be appreciated that the adhesive could be applied along the lower periphery of an airfoil (e.g., lower periphery 1110 of airfoil 1100), and/or along a lower surface when one is present. In other embodiments, an airfoil could be mounted to a trailer (or other object) using various kinds of fasteners, including screws, bolts, rivets, nails, etc.

Figure 15:
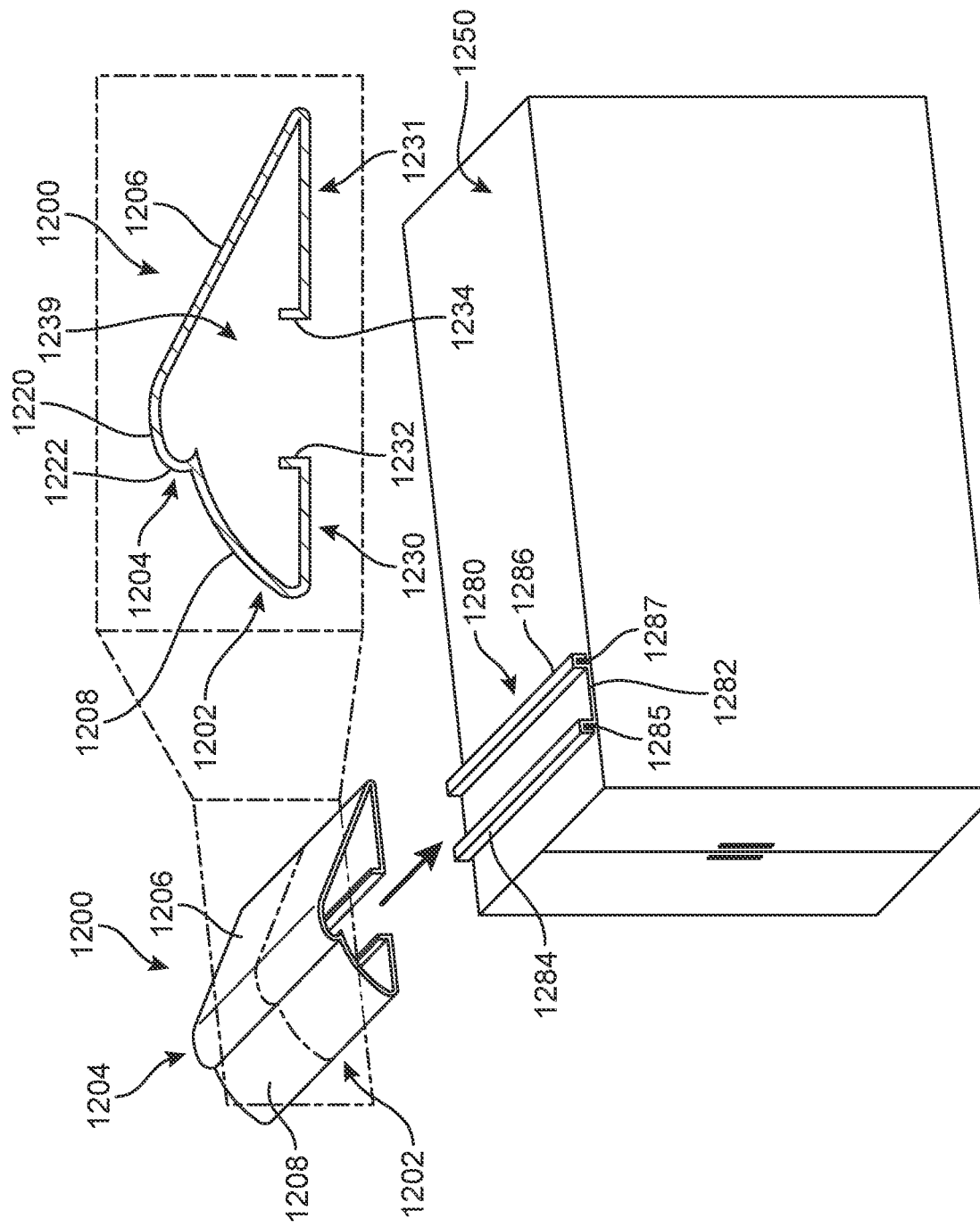
FIG. 15 is a schematic view of an airfoil system and an associated trailer, according to an embodiment.
Figure 16:
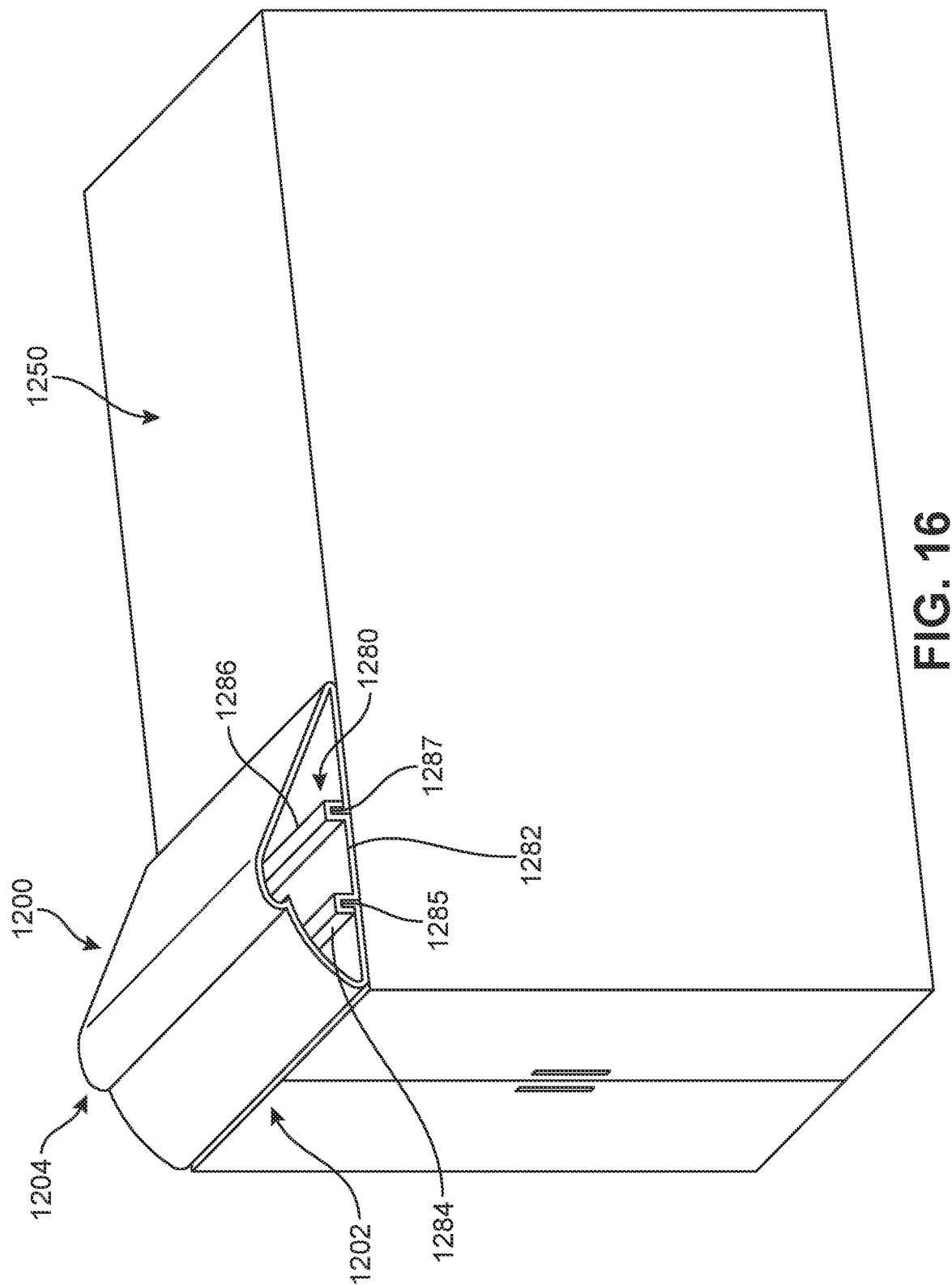
FIG. 16 is a schematic view of an airfoil secured to the trailer using a mounting component, according to an embodiment.

FIGS. 15 and 16 are schematic views of another embodiment of an airfoil 1200, a mounting component 1280 and a trailer 1250. Airfoil 1200 may comprise a base portion 1202 and an extended portion 1204, as well as a first surface 1206 and a second surface 1208.

Airfoil 1200 may have a geometry that is similar in some respects to airfoil 500. For example, as best seen in the cross-sectional view of FIG. 15, the profile of second surface 1208 and its continuation with extended portion 1204 may have a substantially similar profile to that of airfoil 500, as depicted, for example, in FIGS. 6-8. As seen in the enlarged cross-sectional view of FIG. 15, extended portion 1204 and second surface 1208 together form an upper airfoil surface that has a geometry similar to the suction surface of airfoil 500. That is, the upper airfoil surface includes a suction side surface 1220 and an elliptic surface 1222 that extends continuously with second surface 1208. Moreover, as with airfoil 500, the respective of curvatures suction side surface 1220 and elliptic surface 1222 may be different to help prevent the boundary layer of airflow from delaminating from airfoil 1200 as air passes across extended portion 1204 and is directed towards second surface 1208.

FIGS. 15 and 16 also depict an alternative method of attaching an airfoil to a trailer. Referring to FIGS. 15 and 16, the present embodiment uses a mounting component 1280 (e.g. a mounting rail) to secure airfoil 1200 in place. Specifically, mounting component 1280 may be secured to trailer 1250 using conventional methods such as adhesives, fasteners (e.g., screws, rivets, etc.), welds or other methods. Then airfoil 1200 may be attached to mounting component 1280 and thereby secured to trailer 1250.

Mounting component 1280 and airfoil 1200 may have geometries adapted to fit one another. As seen in FIG. 15, airfoil 1200 includes a first lower portion 1230 with a first peripheral ridge 1232 as well as a second lower portion 1231 with a second peripheral ridge 1234. These peripheral ridges may be oriented towards an interior 1239 of airfoil 1200 (and so away from the trailer when the airfoil is attached to the trailer). First lower portion 1230 and second lower portion 1231 may be separated by a gap that receives part of mounting component 1280 when airfoil 1200 is attached.

Mounting component 1280 may include a central mounting portion 1282 that is secured directly to a trailer as well as a first engagement portion 1284 and a second engagement portion 1286 on opposing sides of central mounting portion 1282. Each engaging portion may include a slot configured to receive a peripheral ridge. Specifically, first engagement portion 1284 includes first slot 1285 for receiving first peripheral ridge 1232 and second engagement portion 1286 includes a second slot 1287 for receiving second peripheral ridge 1234. These slots may be oriented so that when central mounting portion 1282 is attached to a trailer the open side of the slots face towards the trailer (and are thus oriented to receive the upwardly oriented ridges of airfoil 1200).

As seen in FIGS. 15-16, with mounting component 1280 secured to trailer 1250, airfoil 1200 may be attached by sliding it over mounting component 1280 in such a way that the ridges of airfoil 1200 are engaged with the corresponding slots in mounting component 1280. Once in place, airfoil 1200 could be help in place by friction and/or by additional provisions such as a removable fastener (a screw, bolt, etc.).

Although FIGS. 15-16 only depict a single airfoil, other embodiments could incorporate similar airfoils along the side rearward edges of a trailer as well.

In different embodiments, materials for an airfoil used with a vehicle could vary. In one embodiment, an airfoil could comprise a material including a plastic. Exemplary plastics include, but are not limited to: polyethylene (PE), polypropylene, acetal, acrylic, nylon (polyamides), polystyrene, polyvinyl chloride (PVC), acrylonitrile butadiene styrene (ABS) and polycarbonate. In other embodiments, an airfoil could comprise a material including a metal. An airfoil could also be manufactured using any known processes including 3D-printing, molding and extrusion processes.

In different embodiments, the dimensions of an airfoil configured for use with a trailer could vary. As an example, in some embodiments, airfoil 1100 could have a width (i.e., a dimension extending between first surface 1106 and second surface 1108) in the range of approximately 0.5 to 4 feet. In some embodiments, an airfoil could have a width greater than 4 feet. In one embodiment, airfoil 1100 could have a width of approximately 3½ feet. In some embodiments, airfoil 1100 could have a height in the range of approximately 0.5 to 1.5 feet. In some embodiments, an airfoil could have a height of approximately 1 foot. In some embodiments, the height of an airfoil could be constrained by factors including overhead clearance (along the top) and/or clearance with rear doors along the sides.

It may be appreciated that while the exemplary embodiments depict a configuration with airfoils disposed approximately at the rearward most edges of a trailer (i.e., the top rearward edge and opposing side rearward edges) in other embodiments airfoils could be disposed at different positions with respect to a rearward edge. In some cases, portions of an airfoil could extend past a rearward edge. In other cases, an airfoil could be positioned so its spaced away from an adjacent rearward edge.

Figure 17:
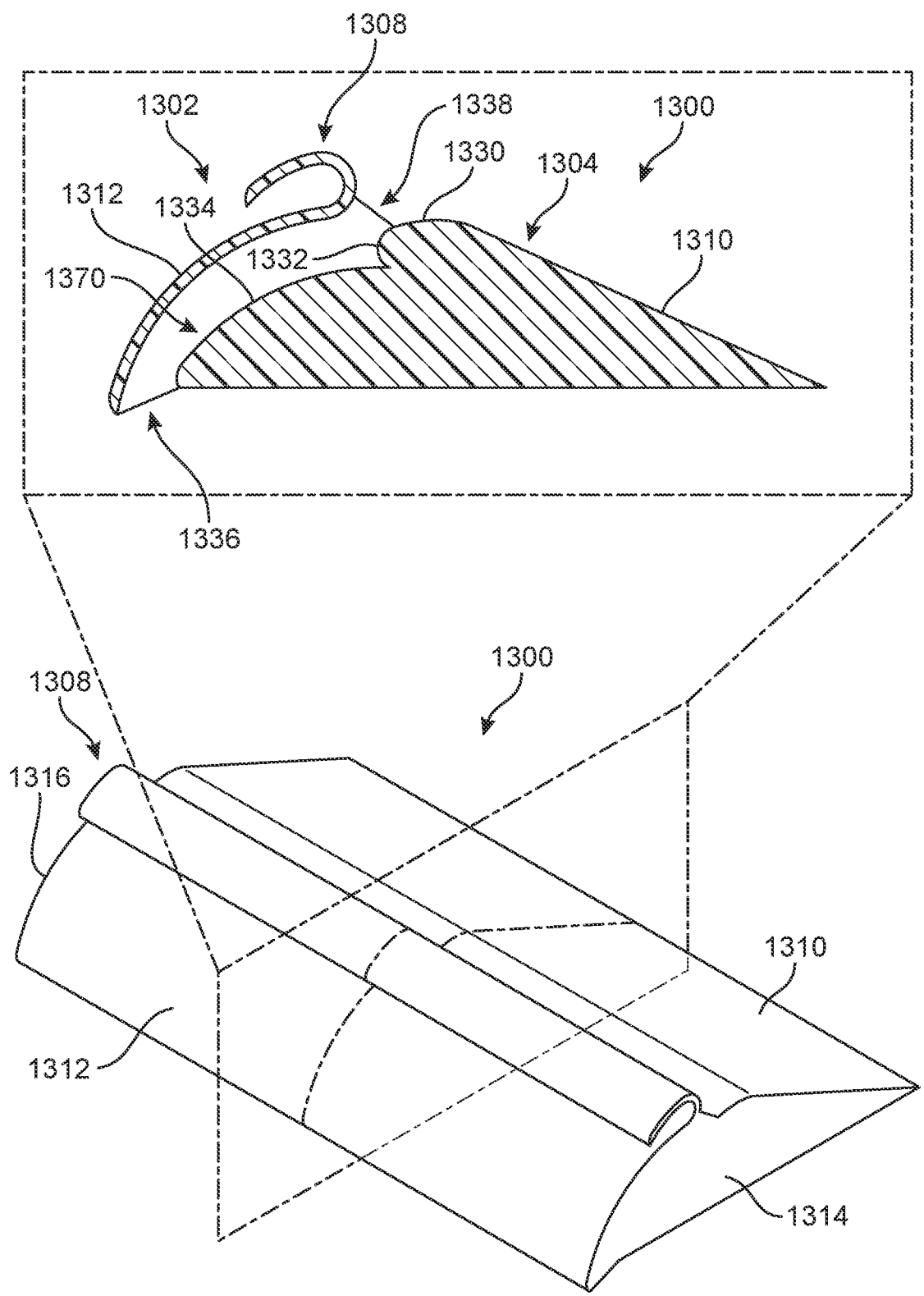
FIG. 17 is a schematic view of another embodiment of an airfoil.
Figure 18:
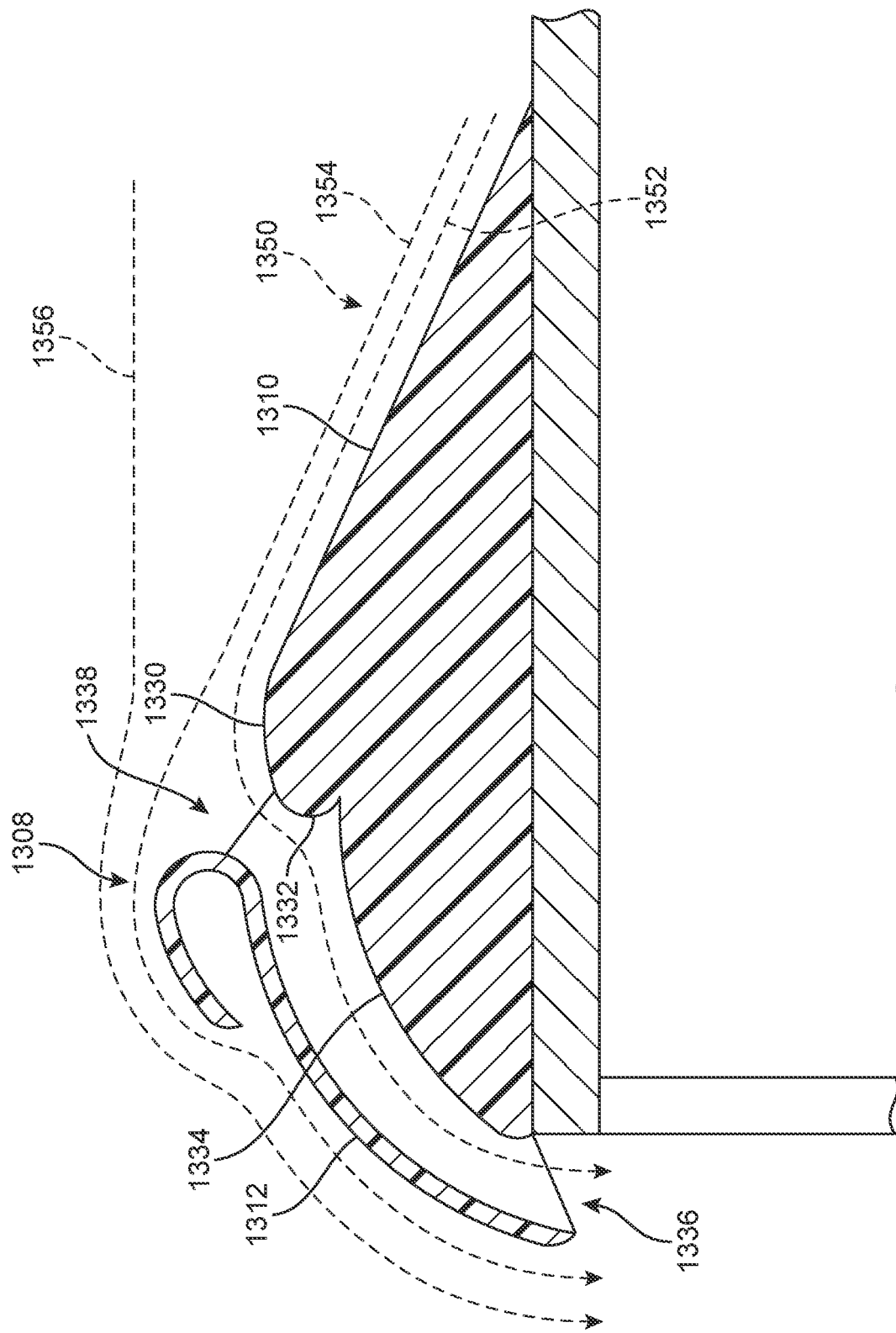
FIG. 18 is a schematic cross-sectional view of an embodiment of an airfoil.

FIGS. 17 and 18 illustrate another embodiment of an airfoil 1300. Specifically, FIG. 17 illustrates a schematic isometric view of an embodiment of airfoil 1300 along with an enlarged cross-sectional view. FIG. 18 is a schematic cross-sectional view of airfoil 1300 demonstrating how air may flow across various surfaces.

Referring now to FIG. 17, airfoil 1300 may include similar provisions to airfoil 1100 described above. Specifically, airfoil 1300 may include a first surface 1310 and a second surface 1312 for directing air up and over an extended portion 1308 of airfoil 1300. Likewise, in some embodiments, airfoil 1300 includes a third surface 1314 and a fourth surface 1316 at opposing ends.

For purposes of clarity, airfoil 1300 may be characterized as comprising surfaces associated with different airfoil types. As used herein, the term "open airfoil type" refers to an airfoil or portion of an airfoil where the leading end has a folded, or open, geometry. An example of an open airfoil type is airfoil 100, described above and shown, for example, in FIGS. 1-5. As used herein, the term "closed airfoil type" refers to an airfoil or portion of an airfoil where the leading end has a closed geometry. An example of a closed airfoil type is airfoil 500, described above and shown, for example, in FIGS. 6-8.

Airfoil 1300 may comprise two different types of airfoil surfaces that are stacked, or otherwise adjacent one another, with some spacing between them. Specifically, airfoil 1300 includes a first airfoil portion 1302 and a second airfoil portion 1304 that are each associated with a distinct type of suction-side surface. First airfoil portion 1302 includes extended portion 1308 and second surface 1312. Extended portion 1308 and second side surface 1312 may have a geometry similar to airfoil 1100 and to airfoil 100 (i.e., the geometry may be similar to the suction side of airfoil 100). Second airfoil portion 1304 includes first surface 1310, outer suction surface 1330, elliptic surface 1332 and an interior suction surface 1334. Together, outer suction surface 1330, elliptic surface 1332 and interior suction surface 1334 may have a similar geometry to airfoil 1200 and airfoil 500 (i.e., the geometry may be similar to the suction side of airfoil 500).

In some embodiments, a passageway 1370 extends through airfoil 1300 to provide access to interior suction surface 1334. Passageway 1370 may be open at upper opening 1338 and lower opening 1336, so that air can flow from the top of airfoil 1300 to the bottom.

Using two airfoil surfaces may help improve airflow by directing incoming (horizontal) air down across two separate suction surfaces and increasing the volume of air that can be directed down. As seen in FIG. 18, in operation incoming airflow 1350 travels up first surface 1310 to outer suction surface 1330. Some of this airflow 1350 takes a first airflow path 1352 through upper opening 1338, down elliptic surface 1332 and then further down along interior suction surface 1334 before exiting through lower airfoil opening 1336. Some of the air reaching outer suction surface 1330 may take a second airflow path 1354 that flows up to, and around, extended portion 1308, and then back down second surface 1312. Moreover, in some cases, the angle of attack of the airfoil surface associated with first airfoil portion 1302 helps capture air traveling horizontally at a higher level above first surface 1310. For example, air flowing along airflow path 1356 may flow horizontally until catching the leading edge of extended portion 1308 and being drawn down along second surface 1312.

Figure 19:
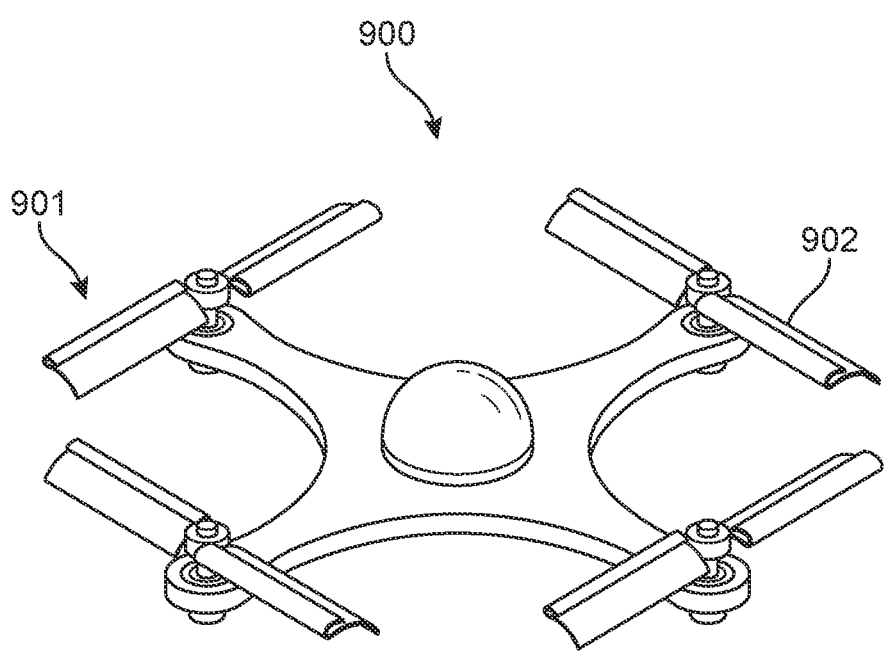
FIG. 19 is a schematic view of an embodiment of a drone with multiple blades.
Figure 20:
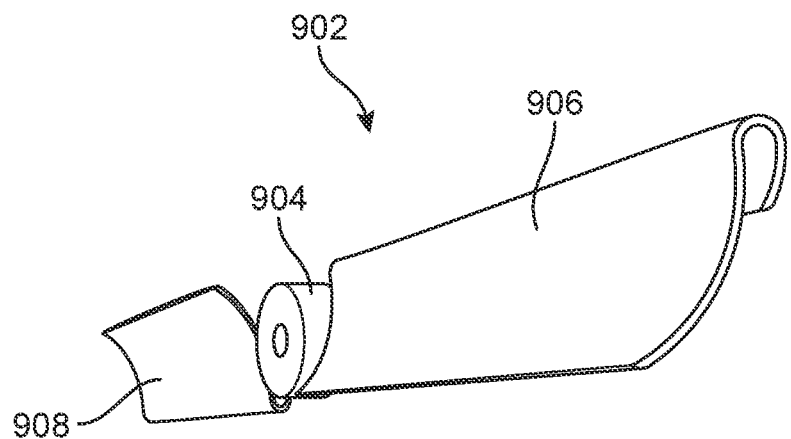
FIG. 20 is a schematic isometric view of a blade for a drone.
Figure 21:
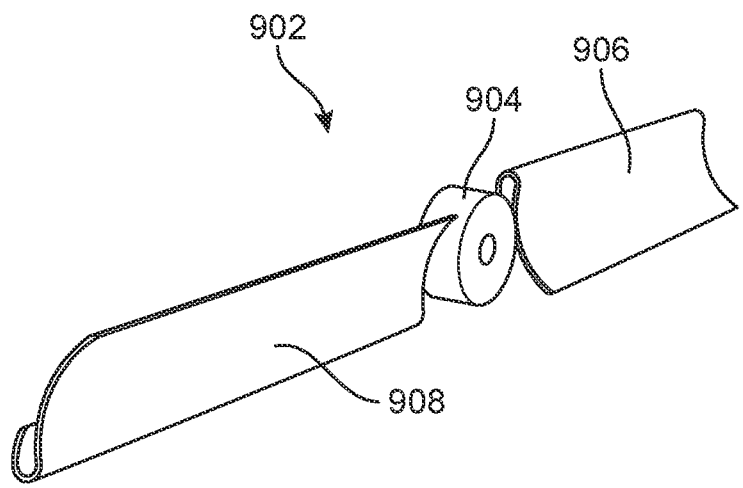
FIG. 21 is a schematic isometric view of the blade of FIG. 12.

In another embodiment, depicted in FIGS. 19-21, airfoils having geometries similar to airfoil 100 or airfoil 500 could be used as blades in a drone. FIGS. 19-21 depict a particular blade design for quadcopter drone 900 with four blades 901. In this exemplary design, as shown in FIGS. 20-21, blade 902 has central hub 904 for mounting to a shaft, as well as first blade section 906 and second blade section 908. In this case, each blade section has a geometry similar to airfoil 100. In such a design, the blade geometry may help improve thrust as the blades of quadcopter drone 900 rotate. Although the embodiment depicts a drone, in other embodiments similar airfoil geometries could be used with any kind of rotary wing aircraft, such as helicopters (e.g., helicopter 1002 in FIG. 24).

The disclosed airfoil shapes can be applied to any kind of rotary kinetic fluid motor or pump in which the motor, pump, or similar device includes a runner and in which a working fluid is guided to, around, or from, the runner. Such devices may include, but are not limited to, turbines, wheels, centrifugal pumps, and blowers. The disclosed airfoil shapes can also be applied to any kind of fluid reaction surfaces, including impellers, which are acted on, or act on, a working fluid.

Figure 22:
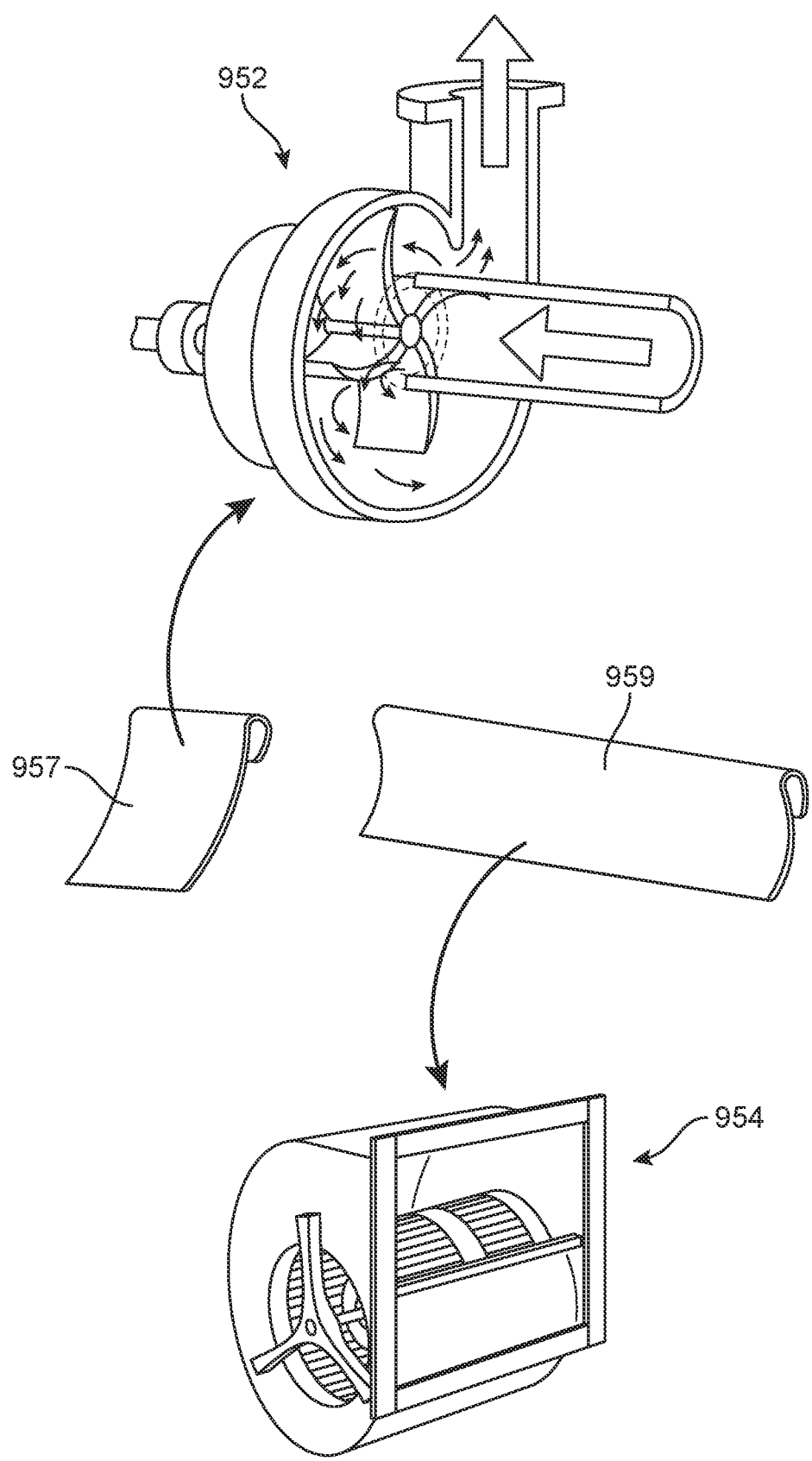
FIG. 22 is a schematic view of multiple fluid devices that may incorporate airfoils, according to an embodiment.

As shown in FIG. 22, exemplary airfoil 957 and airfoil 959 could be used as blades in centrifugal pump 952 and/or blades in centrifugal blower 954, respectively. In some embodiments, airfoil 957 and airfoil 959 may be configured with different dimensions according to their intended use. For example, airfoil 957 may be longer than airfoil 959. Additionally, airfoil 957 may have a smaller width than airfoil 959. This difference in geometry reflects the respective applications of each airfoil in centrifugal pump 952 and centrifugal blower 954. Though exemplary airfoils 957 and airfoil 959 are depicted as similar to airfoil 100 in shape (i.e. each includes an overhang portion), it may be appreciated that the design is only exemplary and the exact dimensions, materials, and/or other properties could be varied according to the particular use (e.g., in a pump or a blower). Moreover, in some cases, one or both of airfoil 957 and airfoil 959 could alternatively have a solid geometry like airfoil 500.

Figure 23:
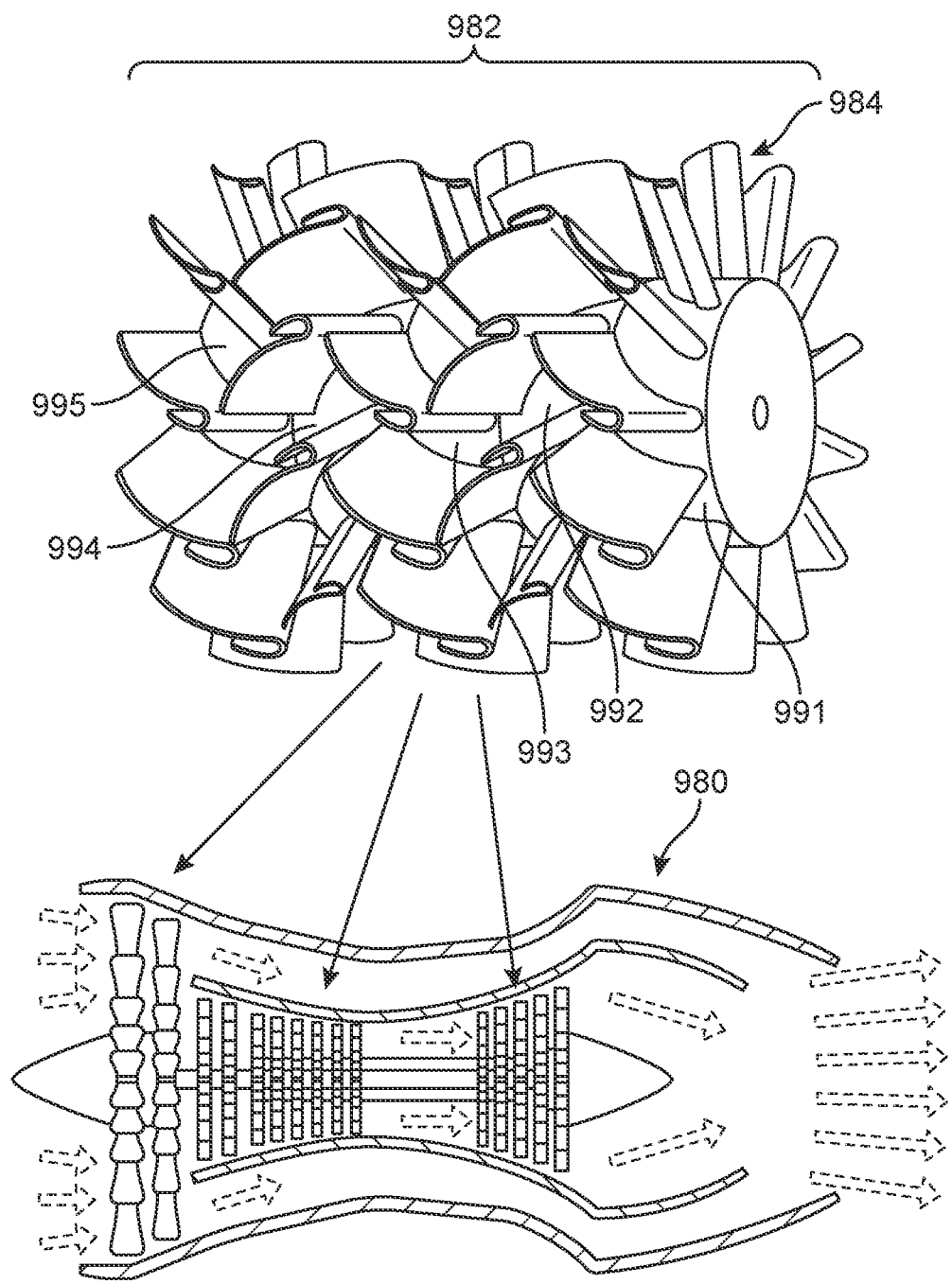
FIG. 23 is a schematic view of a set of turbine rotors with blades that may be associated with a turbine engine, according to an embodiment.

FIG. 23 is a schematic isometric view of engine 980 that includes one or more turbines. It may be appreciated that engine 980 is shown schematically and the specific rotors depicted herein could be deployed in a variety of different engine configurations. Referring to FIG. 23, a section of turbine rotors 982 adapted for use in engine 980 may be configured with blades 984. Each of blades 984 may have a geometry similar to that of airfoil 100. In the exemplary embodiment, first rotor 991, third rotor 993, and fifth rotor 995 comprise of blades arranged in a first orientation while second rotor 992 and fourth rotor 994 comprise blades arranged in a second orientation that is different from the first orientation. In some cases, first rotor 991, third rotor 993, and fifth rotor 995 may be configured to rotate in a first direction, while second rotor 992 and fourth rotor 994 may be configured to rotate in a second direction. Although not shown in FIG. 23, some embodiments could incorporate one or more sets of planetary gears to facilitate counter rotation of one set of rotors. Also, in some embodiments, a shroud (or runner) could be used with one or more sets of rotors. In some embodiments, rotors 982 could be used in either a high-pressure compressor or low-pressure turbine of engine 980. In some embodiments, one or more of rotors 982 could be used as part of an intake fan of an engine 980.

Figure 24:
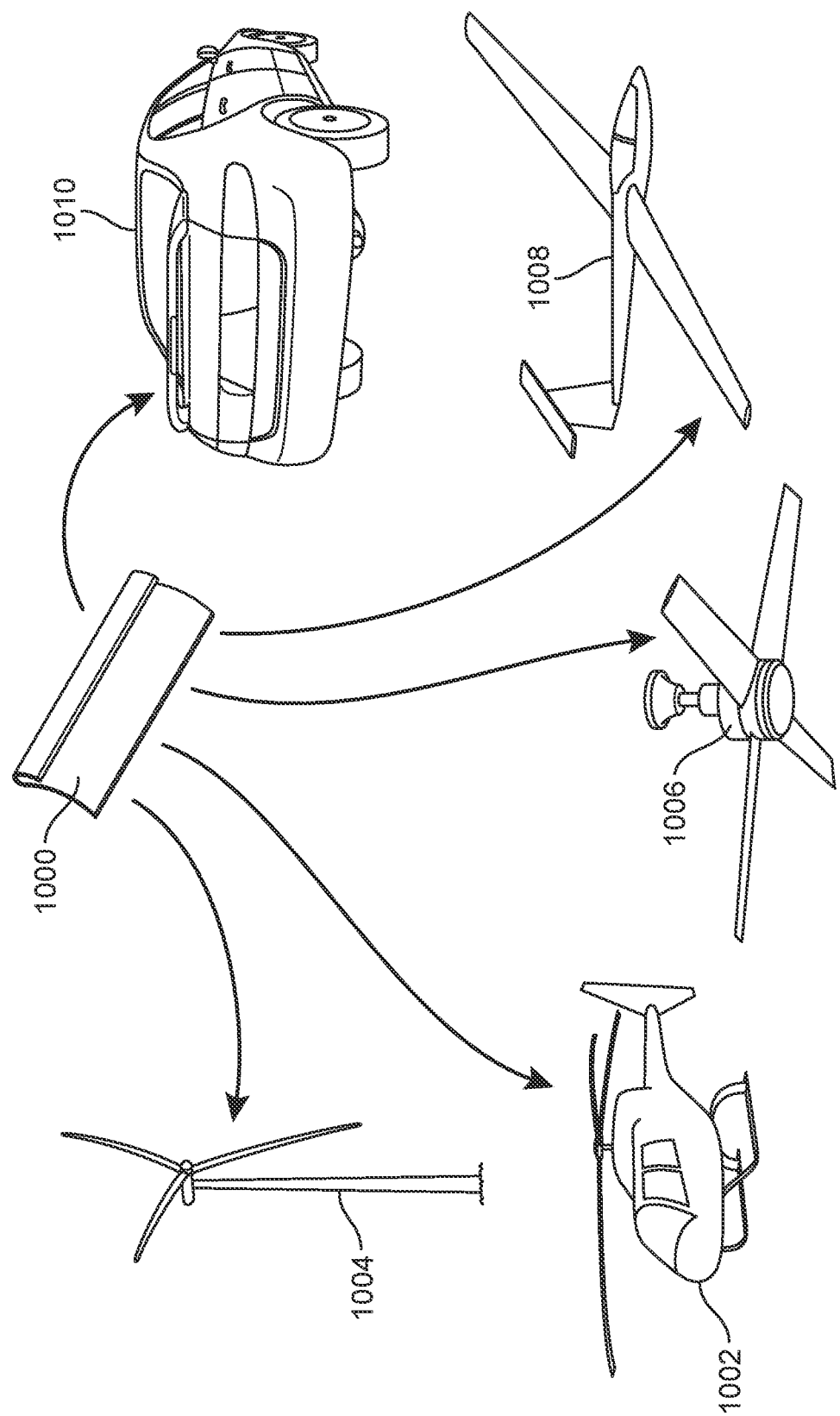
FIG. 24 is a schematic view of various machines that may incorporate an airfoil, according to an embodiment.

FIG. 24 depicts a variety of other machines that may use airfoils having any of the properties discussed above including any of the features of airfoil 100 or airfoil 500. Specifically, airfoil 1000 could be incorporated into the blades, rudders, or other control surfaces of helicopter 1002. Airfoil 1000 could also be incorporated into the blades of wind turbine 1004. Airfoil 1000 could also be incorporated into the blades of fan 1006. Airfoil 1000 could also be incorporated as a fixed wing in various kinds of aircraft, including glider 1008. Airfoil 1000 could also be incorporated into a car 1010, for example, to operate as a spoiler.

It may be appreciated that airfoils with the disclosed shapes can be used on any surface of a machine or device that contacts a working fluid. In some cases, airfoils with the disclosed shapes could be used on control surfaces of an aircraft such as ailerons, elevators, rudders, spoilers, flaps, slats, air brakes, elevator trims, rudder trims, and aileron trims. Moreover, airfoils with the disclosed shapes could be used on any rotors (e.g., main and tail rotors in a helicopter) and/or propellers of an aircraft.

In different embodiments, airfoils could be manufactured from various materials. Exemplary materials include, but are not limited to, materials known for use in manufacturing turbine blades (e.g., U-500, Rene 77, Rene N5, Rene N6, PWA1484, CMSX-4, CMSX-10, Inconel, GTD-111, EPM-102, Nominic 80a, Niminic 90, Nimonic 105, Nimonic 105 and Nimonic 263). Other materials include ceramic matrix composites. Other materials for airfoils can include, but are not limited to, aluminum, composite materials, steel, titanium as well as other materials.

Airfoils can be manufactured using any known methods. In some embodiments, an airfoil can be formed using an extrusion process.

The dimensions of an airfoil can vary according to its intended application. The chord line length, width, and thickness can all be varied in different ratios while maintaining the general profile shape of airfoil 100 (i.e., an open design) or of airfoil 500 (i.e., a solid design). For example, blades in a turbine may generally be smaller than airfoils used on a truck.

While various embodiments of the invention have been described, the description is intended to be exemplary, rather than limiting, and it will be apparent to those of ordinary skill in the art that many more embodiments and implementations are possible that are within the scope of the invention. Any element of any embodiment may be substituted for another element of any other embodiment or added to another embodiment except where specifically excluded. Accordingly, the invention is not to be restricted except in light of the attached claims and their equivalents. Also, various modifications and changes may be made within the scope of the attached claims.

The invention claimed is:

1. An airfoil for use with a motor vehicle trailer, comprising:
   a base portion and an extended portion extending from the base portion;
   the base portion including a lower periphery, a first surface and a second surface, wherein the first surface extends from the lower periphery to the extended portion and wherein the second surface extends from the lower periphery to the extended portion;
   wherein the second surface is configured to be disposed closer to a rearward side of the motor vehicle trailer than is the first surface to the motor vehicle trailer; and
   wherein the extended portion extends over the second surface.

2. The airfoil according to claim 1, further comprising a turned down portion extending from the second surface and including a lower elliptic portion and a lower side surface that extends from the lower elliptic portion up to the lower periphery.

3. The airfoil according to claim 1, wherein the extended portion includes an overhang portion that extends over some of the second surface of the base portion and wherein the extended portion includes an elliptic portion connecting the base portion and the overhang portion.

4. The airfoil according to claim 1, wherein the airfoil includes a turned down portion that extends continuously with the second surface, and wherein the turned down portion is configured to hang over a rearward edge of the motor vehicle trailer.

5. The airfoil according to claim 1, wherein the base portion is attached to the motor vehicle trailer using an adhesive.

6. The airfoil according to claim 1, wherein the base portion is attached to the motor vehicle trailer using one or more magnets.

7. An airfoil for use with a motor vehicle trailer, comprising:
   a base portion and an extended portion extending from the base portion;
   the base portion including a lower periphery, a first surface and a second surface, wherein the first surface extends from the lower periphery to the extended portion and wherein the second surface extends from the lower periphery to the extended portion;
   wherein the second surface is configured to be disposed closer to a rearward side of the motor vehicle trailer than is the first surface to the motor vehicle trailer; and
   wherein the airfoil includes ridges along a lower side of the base portion and wherein the ridges are configured to engage slots in a mounting component on the motor vehicle trailer.

8. A motor vehicle trailer with an airfoil, the airfoil further comprising:
   a base portion and an extended portion extending from the base portion;
   the base portion including a lower periphery, a first surface and a second surface, wherein the first surface extends from the lower periphery to the extended portion and wherein the second surface extends from the lower periphery to the extended portion;
   wherein the second surface is configured to be disposed closer to a rearward side of the motor vehicle trailer than is the first surface to the motor vehicle trailer; and
   wherein the extended portion extends over the second surface.

9. The motor vehicle trailer with the airfoil according to claim 8, further comprising a turned down portion extending from the second surface and including a lower elliptic portion and a lower side surface that extends from the lower elliptic portion up to the lower periphery.

10. The motor vehicle trailer with the airfoil according to claim 8, wherein the extended portion includes an overhang portion that extends over some of the second surface of the base portion and wherein the extended portion includes an elliptic portion connecting the base portion and the overhang portion.

11. The motor vehicle trailer with the airfoil according to claim 8, wherein the airfoil includes a turned down portion that extends continuously with the second surface, and wherein the turned down portion is configured to hang over a rearward edge of the motor vehicle trailer.

12. The motor vehicle trailer with the airfoil according to claim 8, wherein the base portion is attached to the motor vehicle trailer using an adhesive.

13. The motor vehicle trailer according to claim 8, wherein the base portion is attached to the motor vehicle trailer using one or more magnets.

14. A motor vehicle trailer with an airfoil, the airfoil further comprising:
a base portion and an extended portion extending from the base portion;
the base portion including a lower periphery, a first surface and a second surface, wherein the first surface extends from the lower periphery to the extended portion and wherein the second surface extends from the lower periphery to the extended portion;
wherein the second surface is configured to be disposed closer to a rearward side of the motor vehicle trailer than is the first surface to the motor vehicle trailer; and
wherein the airfoil includes ridges along a lower side of the base portion, wherein the motor vehicle trailer includes a mounting component with slots, and wherein the ridges are configured to engage the slots.

15. An airfoil for use with a motor vehicle trailer, comprising:
a first airfoil portion having a first suction side surface;
a second airfoil portion having a second suction side surface; and
a passageway for airflow disposed between the first airfoil portion and the second suction side surface of the second airfoil portion,
wherein the first airfoil portion comprises an overhang portion that hangs over the first suction side surface.

16. The airfoil according to claim 15, wherein the second airfoil portion further comprises:
an outer suction surface; and
an elliptic surface extending from the outer suction surface down to the second suction side surface.

17. The airfoil according to claim 15, wherein the second airfoil portion comprises an elliptic surface that is continuous with the second side suction surface.

18. The airfoil according to claim 15, wherein the airfoil comprises a base portion with a first base portion surface, and wherein air flowing over the airfoil flows up the first base portion surface towards the first airfoil portion and the second airfoil portion.

19. The airfoil according to claim 18, wherein some of the air flowing up the first base portion surface flows down the second side suction surface and wherein some of the air flowing up the first base portion surface flows down the first side suction surface.

20. The airfoil according to claim 19, wherein the some of the air that flows down the second side suction surface does not flow down the first side suction surface.

* * * * *